US010803507B1

(12) United States Patent
Verma et al.

(10) Patent No.: US 10,803,507 B1
(45) Date of Patent: Oct. 13, 2020

(54) SYSTEM FOR GENERATING OUTPUT COMPARING ATTRIBUTES OF ITEMS

(71) Applicant: AMAZON TECHNOLOGIES, INC., Seattle, WA (US)

(72) Inventors: Karan Verma, Seattle, WA (US); David Charles Couvrette, Kenmore, WA (US); Manish Kumar Dalmia, Seattle, WA (US); Alberto Milan Gutierrez, Seattle, WA (US); Benjamin McDougall Hartung, Seattle, WA (US); Rohit Jain, Sunnyvale, CA (US); Raymond Solyne Matthieu, III, Seattle, WA (US); Elsie Nallipogu, Bellevue, WA (US); Teng Yi, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 978 days.

(21) Appl. No.: 14/949,718

(22) Filed: Nov. 23, 2015

(51) Int. Cl.
*G06Q 30/00* (2012.01)
*G06Q 30/06* (2012.01)
*G06F 3/0484* (2013.01)

(52) U.S. Cl.
CPC ..... *G06Q 30/0629* (2013.01); *G06F 3/04847* (2013.01)

(58) Field of Classification Search
CPC .................................................. G06Q 30/0629
USPC ..................................................... 705/26.64
See application file for complete search history.

(56) References Cited

U.S. PATENT DOCUMENTS

| 6,014,661 | A  | * | 1/2000  | Ahlberg | G06F 17/30572 |
| 8,285,602 | B1 | * | 10/2012 | Yi | G06Q 30/00 |
|           |    |   |         |    | 705/26.7 |
| 8,380,583 | B1 | * | 2/2013  | Chanda | G06Q 30/0255 |
|           |    |   |         |    | 705/26.64 |
| 8,458,021 | B1 | * | 6/2013  | Bous | G06Q 30/0635 |
|           |    |   |         |    | 705/14.1 |
| 8,712,868 | B2 | * | 4/2014  | Foster | G06Q 30/02 |
|           |    |   |         |    | 705/26.7 |

(Continued)

FOREIGN PATENT DOCUMENTS

| WO | WO-0152126 | A2 | * | 7/2001 | .............. G06Q 30/02 |
| WO | WO-0244942 | A1 | * | 6/2002 | .............. G06Q 30/02 |

OTHER PUBLICATIONS

Mitsuaki Nakasumi; "Decision Making Aid in Mobile Environment by Behavioral Characteristic"; 2010; Komazawa University (Year: 2010).*

*Primary Examiner* — Naeem U Haq
*Assistant Examiner* — Norman Donald Sutch, Jr.
(74) *Attorney, Agent, or Firm* — Lindauer Law, PLLC

(57) ABSTRACT

Described are techniques for automatically generating tables or other types of output for comparing attributes of similar items. For each attribute of a particular item, a system may determine whether that attribute is generic to most items or specific to an item or category, whether data for that attribute is available for a sufficient number of items, and whether the value of that attribute differs among a sufficient number of items to facilitate a useful comparison. Responsive to user input, item data and one or more tables or other types of output may be provided to a user device. User input interacting with a table(s) or other output may be used to modify the stored table or output or to navigate to other tables, outputs, or item data.

20 Claims, 8 Drawing Sheets

(56) References Cited

U.S. PATENT DOCUMENTS

| | | | | |
|---|---|---|---|---|
| 10,127,595 | B1* | 11/2018 | Hipschman | G06Q 30/0629 |
| 2004/0143600 | A1* | 7/2004 | Musgrove | G06F 17/30864 |
| 2005/0028046 | A1* | 2/2005 | McArdle | G06F 17/30303 |
| | | | | 714/48 |
| 2006/0167757 | A1* | 7/2006 | Holden | G06Q 30/06 |
| | | | | 705/27.2 |
| 2007/0203902 | A1* | 8/2007 | Bauerle | G06F 17/30017 |
| 2008/0004989 | A1* | 1/2008 | Yi | G06Q 30/0631 |
| | | | | 705/26.1 |
| 2008/0294583 | A1* | 11/2008 | Hunt | G06Q 20/0855 |
| | | | | 706/46 |
| 2011/0270628 | A1* | 11/2011 | Mital | G06Q 30/0282 |
| | | | | 705/3 |
| 2013/0035999 | A1* | 2/2013 | Berger | G06Q 30/0629 |
| | | | | 705/14.23 |
| 2013/0262271 | A1* | 10/2013 | Bous | G06Q 30/0635 |
| | | | | 705/26.81 |
| 2013/0311335 | A1* | 11/2013 | Howard | G06F 3/017 |
| | | | | 705/26.64 |
| 2014/0152847 | A1* | 6/2014 | Zomet | G06Q 30/0629 |
| | | | | 348/207.1 |
| 2015/0142609 | A1* | 5/2015 | Garera | G06Q 30/0629 |
| | | | | 705/26.64 |
| 2016/0092090 | A1* | 3/2016 | Stojanovic | G06F 3/04847 |
| | | | | 715/771 |
| 2016/0154862 | A1* | 6/2016 | Gabbai | G06Q 30/0241 |
| | | | | 707/722 |
| 2016/0379240 | A1* | 12/2016 | Bous | G06Q 50/188 |
| | | | | 705/80 |
| 2017/0124619 | A1* | 5/2017 | Abhishek | G06Q 30/0625 |
| 2017/0255909 | A1* | 9/2017 | Hansen | G06Q 10/087 |

\* cited by examiner

SYSTEM FOR GENERATING OUTPUT COMPARING ATTRIBUTES OF ITEMS

BACKGROUND

Users purchasing products over the Internet or another network may compare certain attributes of similar products to facilitate purchasing decisions.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
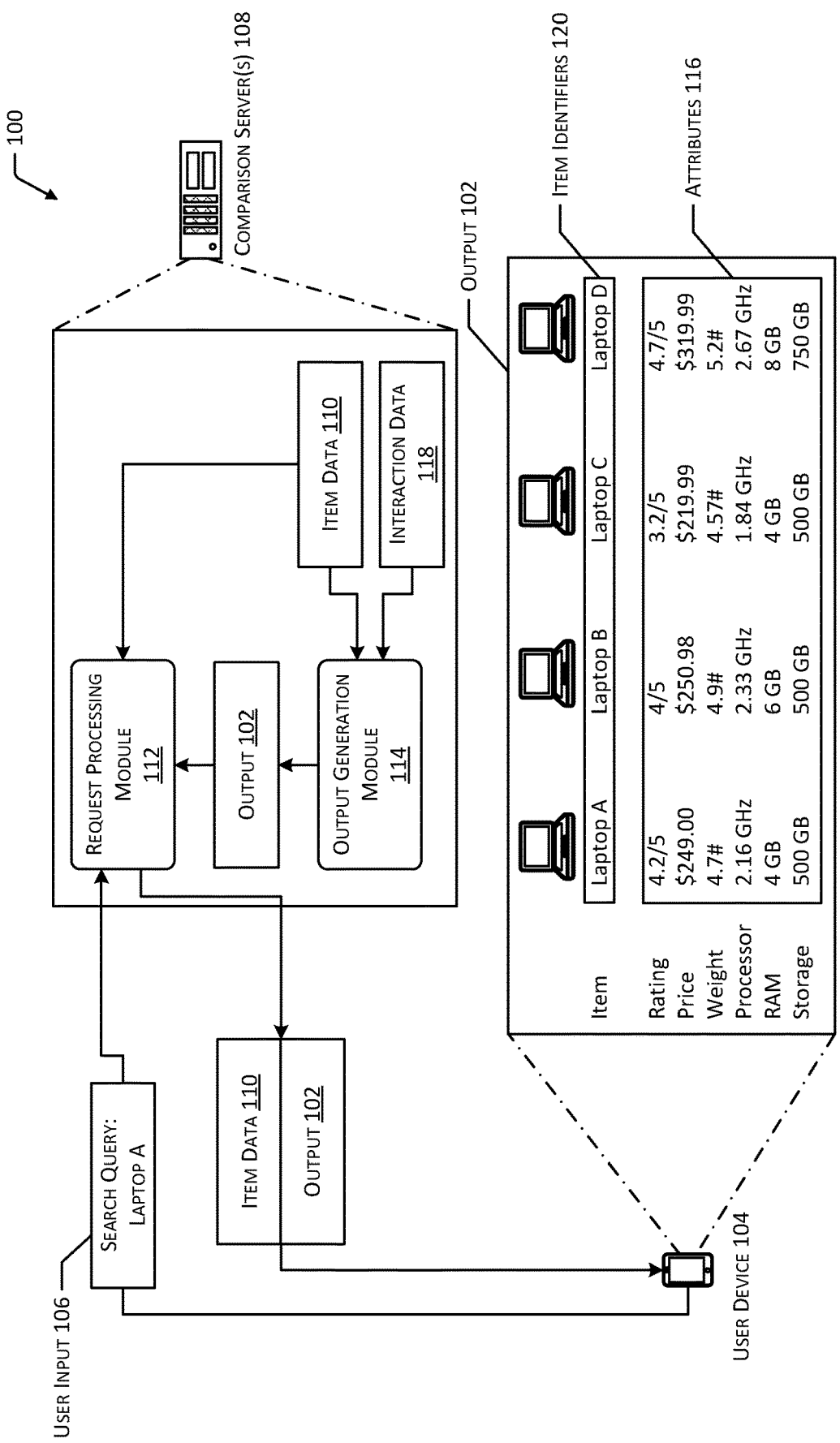
FIG. 1 depicts a system for providing a comparison output, such as a table, responsive to a request from a user device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Before purchasing an item from an online marketplace or other vendor, a user may compare multiple similar products. For example, a user seeking to purchase a cellular telephone may compare the price, weight, dimensions, display size, display resolution, and processor speed for multiple cellular telephones. Users may also reference ratings or reviews, provided by other consumers and third parties, regarding particular items of interest. In some cases, a user may not be knowledgeable regarding a specific product or a particular type of product. For example, a user seeking to purchase a computer may be uncertain whether the user's needs will be met by purchasing a desktop, a laptop, a notebook, or a tablet. As another example, a user seeking to purchase a laptop computer may not be knowledgeable regarding popular manufacturers, models, or features of laptop computers. Continuing the example, the user may not be knowledgeable regarding the attributes that differentiate a particular laptop computer from other laptop computers, such as processor speed, dimensions, weight, display size, display resolution, quantity of RAM, quantity of data storage, and so forth. A user lacking knowledge regarding a particular product or category of products may experience difficulty when attempting to discern which products within a category are similar or comparable to one another and which attributes of the products may be useful when performing a comparison.

Described in this disclosure are techniques for automatically determining items that are comparable to a particular item and automatically determining attributes that may be useful when comparing the particular item to other items, without requiring user interaction to select the comparable items or the useful attributes. The determined items and attributes may be used to automatically generate a table or other form of output, without requiring user interaction. The table or other output may be presented, via a browser interface or other user interface, in association with data relating to the particular item. While particular implementations described in this disclosure may include a table as one example of an output, other types of output may include lists, grids, webs, graphical user interfaces (e.g., images of items having indications of attributes positioned within the image(s)), audio outputs, haptic or tactile outputs, and so forth. In one implementation, the output may include a list of one or more items and a list of one or more attributes associated with the items. User input selecting one or more of the attributes may be used to arrange or filter the list of items. In some implementations, a table or other form of output may be pre-generated for particular items, such that when a webpage or other interface associated with the item is accessed, the output may be quickly rendered and presented to a user. In other implementations, the table or other output may be provided responsive to a user search query or other types of user input indicative of a particular item or category of items. For example, responsive to a user search query, a table comparing the five bestselling items within a category may be presented adjacent to a list of search results.

To generate a table or other type of output, item data associated with a first item may be accessed, the item data indicating one or more attributes of the first item. For example, the first item may include a surround-sound speaker system, and the attributes may include a number of speakers, a number of inputs for accommodating devices, an audio power of the speakers, dimensions of the speakers, weights of the speakers, a means by which the speakers may be mounted to a surface, and so forth. Other attributes of the first item may include a price, an average user rating, an identification of a manufacturer, an indemnification of a shipper, packaging dimensions, colors, materials, and so forth. Some of the attributes may be generic to most items. For example, nearly every item offered for sale will include a price and packaging dimensions. Other attributes may be specific or unique to a particular item or to a particular category of items. For example, an audio power may be an attribute that is specific to speaker systems and devices that include speakers. Other types of items may not include an indication of audio power.

Item data associated with one or more additional items that are similar to or comparable to the first item may also be accessed. In some implementations, similar items may be determined based on the category associated with the first item and the additional items. For example, if the first item is a laptop computer, other laptop computers available for purchase may be determined to be similar to the first item based on the common category associated with the items. In other implementations, similar items may be determined based on the attributes associated with the first item and the additional items. For example, if the first item is a laptop computer, other types of computers, including desktop computers, tablet computers, and so forth, may include many of the same attributes as the first item. Continuing the example, item data for multiple types of computers may include attribute values for processor speed, quantity of RAM, quantity of data storage, and so forth. If a second item includes a threshold quantity or a threshold percentage of attributes that correspond to the attributes of the first item, the second item may be determined to be similar to the first item based on the corresponding common attributes. In other implementations, similar items may be determined based on the values of one or more common attributes. For example, two computers having one or more of a price, a processor speed, or a display size within a threshold quantity or threshold percentage of one another may be determined to be similar based on the similar attribute values. Continuing the example, multiple items of the same category that are priced similarly are more likely to be comparable products than items having a significant difference in price.

In some implementations, similar items may be determined based on interaction data associated with the items. For example, interaction data may include one or more of purchase history data, search history data, browsing history data, clickstream data, and so forth, associated with one or more items or user accounts. In some implementations, interaction data may be determined from a user device, such as data associated with a browser or other application stored on the user device, user data associated with one or more user accounts, and so forth. Continuing the example, interaction data may indicate one or more additional items that are frequently accessed during transactions associated with the first item. A threshold quantity or threshold percentage of users may view a webpage associated with the first item or may purchase the first item. If this threshold quantity or percentage of users also viewed webpages associated with certain other items or purchased the other items, such as during a transaction or session associated with the first item, the other items may be determined to be comparable to or similar to the first item based on the interaction data. For example, if 50% of users that viewed a webpage associated with a surround sound speaker system also viewed a webpage associated with a sound bar during the same session or transaction, the sound bar may be determined to be a comparable or similar product to the surround sound speaker system.

Based on the item data associated with the first item and the other items determined to be similar to the first item, a subset of attributes that are specific or unique to the first item or to the category associated with the first item may be determined. In some implementations, each attribute associated with the first item may be analyzed to determine a quantity or percentage of other items that include the attribute. If the quantity or percentage of items that include the attribute is less than a maximum threshold quantity or percentage, the attribute may be determined to be specific or unique to the first item or to the category associated with the first item. For example, the first item may include values associated with a price and with a packaging size. However, over 90% of the items available in an online marketplace may also include values associated with price and packaging size. Therefore, price and packaging size may be determined to be generic attributes that are not specific or unique to the first item or the category associated with the first item. Continuing the example, the first item may include values associated with processor speed and quantity of RAM. Because processor speed and quantities of RAM are attributes specific to computers, other categories of items (e.g., clothing, books, household goods, etc.) would not include values for these attributes. If the quantity or percentage of items that include values for processor speed and quantity of RAM is less than the maximum threshold quantity or percentage, processor speed and quantity of RAM may be determined to be specific attributes that pertain to the first item or the category associated with the first item.

Attributes that are determined to be specific to an item or a category associated with the item may be included in a table or other output. In some implementations, however, one or more of the attributes specific to the item or category may be excluded. For example, values for a particular attribute may not be available for one or more items associated with a category. Continuing the example, a first item, such as a desktop computer, may be determined to have four Universal Serial Bus (USB) ports. However, for many other desktop computers available for purchase, the item data may not include a value for a number of USB ports. If a quantity of items or a percentage of items that include a value for a particular attribute is less than a minimum threshold quantity or threshold percentage (e.g., 75%), that particular attribute may be excluded from the table or other output. Continuing the example, if only 10% of the desktop computers available for sale include information describing a number of USB ports, this attribute may not be useful when comparing similar desktop computers because a value for the attribute will not be available for 90% of the items. Therefore, the number of USB ports may be excluded from the table or other output.

In some implementations, one or more of the attributes specific to the item or category may be excluded based on the common value(s) of the attribute among a category of items. For example, a first item, such as a laptop computer, may be determined to have 8 gigabytes (GB) of RAM. However, a large quantity of other laptop computers available for purchase may also have 8 GB of RAM. If a quantity of items or a percentage of items that have a common value for a particular attribute exceeds a maximum threshold quantity or threshold percentage (e.g., 90%), the particular attribute may be excluded from the table or other output. Continuing the example, if 90% of the laptop computers available for sale include 8 GB of RAM, this attribute may not be useful when comparing similar laptop computers because the value for the attribute will not differ for 90% of the items. Therefore, a value associated with quantity of RAM may be excluded from the table or other output.

In some implementations, particular attributes may be weighted or scored differently or may be associated with different threshold values based on the importance of the attributes. For example, the dimensions of a notebook computer may be determined to be an important feature that would only be excluded from a table or other output if over 95% of notebook computers did not include values for this attribute or if the same attribute value was common to 95% of the available notebook computers. However, an attribute such as a quantity of High-Definition Multimedia Interface (HDMI) ports included in a notebook computer may be determined to be a less important attribute that may be excluded if 25% of notebook computers lack a value for this attribute or if 35% of notebook computers include a common value for this attribute.

After analyzing at least a subset of the attributes associated with the first item and other items similar or comparable to the first item, a table or other form of output comparing a selected number of items (e.g., from three to five items) may be generated. The table or other output may include one or more of the attributes specific to the first item or the category associated with the first item. In some implementations, the table or other output may also include one or more generic attributes that may be useful to a user, such as the price of the items, user ratings associated with the items, and so forth. In some implementations, the table or other output may not be generated based on one or more threshold values. For example, if a quantity of items similar to the first item is less than a minimum threshold quantity (e.g., three items), the table or other output may not be generated. As another example, if the quantity of attributes that are not excluded from the table or other output is less than a minimum threshold quantity, the output may not be generated. As yet another example, if a quantity of attributes that are excluded from the table or other output exceeds a maximum threshold quantity or threshold percentage, the output may not be generated. For example, a table or other output may normally be generated if values for at least three attributes are determined. However, if more than 50% of the attribute values associated with a set of items were excluded, the output may not be generated.

In some implementations, the table or other output may include one or more user interface elements. For example, user input selecting one or more of the comparable items presented in a table, such as by indicating a particular item using a browser interface, may direct the browser to a webpage associated with the selected item. The webpage associated with the selected item may include a table or other type of output that includes the selected item, one or more items that are similar to the selected item, and attributes of those items. Additional user input indicative of particular items presented in a table or other output may similarly be used to navigate to webpages associated with the selected items, which may include additional tables or other outputs that correspond to the selected items.

In some implementations, user interface elements may include selectable attributes. Selection of one of the attributes having a particular value may cause presentation of a table or other type of output associated with the selected attribute and the associated value. For example, a table displaying three laptop computers and associated attributes may be presented via a browser interface. A first laptop computer may have 4 GB of RAM, a second laptop computer may have 6 GB of RAM, and a third laptop computer may have 8 GB of RAM, in addition to other presented attributes. User input indicating 8 GB of RAM may be received, such as by a user selecting the location where 8 GB of RAM is displayed on the table using a mouse device or another type of input device. Responsive to the user input, a subsequent table or other type of output may be generated that includes the third laptop computer and at least two other laptop computers having 8 GB of RAM. In other implementations, selection of one of the attributes having a particular value may cause presentation of a table or other output including items having values for the selected attribute within a threshold quantity or threshold percentage of the particular value. For example, a table displaying three televisions and associated attributes may be presented. A first television may have a display size of 32 inches, a second television may have a display size of 48 inches, and a third television may have a display size of 52 inches. Responsive to user input indicating 52 inches, a table including televisions having display sizes ranging from 48 inches to 56 inches may be presented.

Implementations within the present disclosure may enable users to efficiently compare noteworthy attributes of similar products, even in cases where a user is not knowledgeable regarding a particular product or category of products. Automatic generation of tables or other types of output that include similar, comparable items and attributes specific to those items or the category associated with the items may eliminate inefficiencies, gaps in information, and user error associated with manual comparisons. Additionally, automatic exclusion of one or more attributes that are not specific to a particular product or category, that do not differ among a significant number of items, or for which insufficient data is available, may focus the output on the most distinguishing attribute values for each item.

FIG. 1 depicts a system 100 for providing a comparison output 102, such as a table, responsive to a request from a user device 104. For example, a user device 104 may communicate with an online marketplace or another type of vendor by providing user input 106 to one or more comparison servers 108. The user device 104 may include any manner of computing device, such as a mobile device, set-top box, tablet computer, personal computer, wearable computer, server, and so forth. The user device 104 may communicate with the comparison server(s) 108 via one or more networks, which may include local area networks (LANs), wireless LANs, wide area networks (WANs), wireless WANs, and so forth. For example, the user device 104 may include interfaces compatible with Ethernet, Wi-Fi, Bluetooth, ZigBee, Z-Wave, 3G, 4G, LTE, and so forth.

While FIG. 1 depicts a single server representative of the comparison server(s) 108, the comparison server(s) 108 may include any number and any type of computing devices including, but not limited to, the types of computing devices described with regard to the user device 104. In some implementations, the comparison server(s) 108 may be associated with an online marketplace. For example, a first comparison server 108 or group of comparison servers 108 may store item data 110 associated with one or more items for sale and provide the item data 110 to user devices 104 responsive to user input 106. A second comparison server 108 or group of comparison servers 108 may generate tables or other outputs 102 to be provided to user devices 104 based on the item data 110.

In the example depicted in FIG. 1, the user input 106 provided from the user device 104 to the comparison server(s) 108 may include a search query. For example, a user associated with the user device 104 may intend to purchase a laptop computer and may provide user input 106 indicative of a search query for a particular laptop computer, "Laptop A". In other implementations, the user input 106 may include a selection of a particular item from a list or other user interface elements. For example, the user input 106 may include selection of an advertisement for an item, a link associated with an item, a particular item from a list of search results, and so forth. In still other implementations, the user input 106 may include a search query for multiple particular items. For example, a user that is researching both laptop and desktop computers may provide a search query including terms that indicate both a particular laptop computer and a particular desktop computer. As another example, the user input 106 may include a search query for one or more particular features that may be found in multiple types of items, such as a display screen having a particular size.

A request processing module 112 associated with the comparison server(s) 108 may receive the user input 106. The request processing module 112 may access item data 110 indicative of one or more items available for purchase and one or more outputs 102 (e.g., tables) previously generated by an output generation module 114 associated with the comparison server(s) 108. The request processing module 112 may determine correspondence between the user input 106 and the item data 110. For example, if the user input 106 includes a search query having keywords, the request processing module 112 may determine one or more items associated with the item data 110 that include the keywords of the search query. The item data 110 presented to the user interface 204 may include a list of search results. As another example, if the user input 106 includes a selection of a link to access a particular item, the request processing module 112 may determine the item data 110 that corresponds to the particular item and provide that item data 110 to the user device 104. In some implementations, the request processing module 112 may process, render, or modify the item data 110 for presentation to the user device 104. For example, item data 110 associated with a particular item may be presented to a browser interface of the user device 104 as a webpage including information regarding the item.

The request processing module 112 may also determine correspondence between one or more outputs 102 and the user input 106. For example, one or more of the outputs 102 may be associated with particular items. The request processing module 112 may determine the particular output 102 that corresponds to the item associated with the user input 106 and provide that particular output 102 to the user device 104. For example, an output 102, such as a table comparing the item associated with the user input 106 with one or more similar items may be provided to the user device 104 concurrent with the item data 110 for that item. Continuing the example, the table may be presented proximate to the item data 110, such as at the bottom of a webpage describing a particular item or the top of a webpage displaying search results responsive to a search query. In some implementations, the position of one or more portions of the item data 110 or other elements within a user interface may affect one or more of the size or the position of the table or other output 102. For example, the request processing module 112 or another module configured to generate a user interface may determine a region of the user interface that is not occupied by item data 110 or other elements and the dimensions of that region. Based on the size of the region, the table or other output 102 may be scaled to fit within the region. For example, a font size or other characteristics of the table or other output 102 may be reduced to fit within a smaller region or enlarged to occupy a larger region. As another example, one or more portions of the output 102 may be omitted to enable the output 102 to fit within a particular region. Continuing the example, one or more rows or columns of a table may be excluded from a user interface to enable the table to be presented within a small region of the user interface. As yet another example, a user interface may include multiple unoccupied regions, and the output 102 may include one or more portions positioned in multiple regions of the user interface. Continuing the example, a first portion of the output 102 relevant to a first item may be positioned proximate to item data 110 associated with the first item, while a second portion of the output 102 relevant to a second item may be positioned proximate to item data 110 associated with the second item. In some implementations, portions of the user interface may be moved, enlarged, reduced over time or responsive to user input. As portions of the user interface are modified, one or more of the position, sizes, or data included in the output 102 may be automatically modified to occupy unused regions of the user interface.

The output(s) 102 associated with particular items may be generated by the output generation module 114. In some implementations, the output generation module 114 may access the item data 110 associated with a particular item and determine one or more attributes 116 associated with that item from the item data 110. For example, to generate an output 102 associated with "Laptop A", the output generation module 114 may access the item data 110 associated with "Laptop A" and determine attributes 116 of "Laptop A" from the item data 110. Continuing the example, the item data 110 associated with "Laptop A" may include attribute values corresponding to a user rating (e.g., "4.2/5"), a price (e.g., "$249.00"), a weight (e.g., "4.7#"), a processor speed (e.g., "2.16 GHz"), a quantity of RAM (e.g., "4 GB"), and a quantity of storage (e.g., "500 GB"). The item data 110 may also include other attributes 116 associated with "Laptop A", such as a packaging size when shipped, material specifications, colors, quantities of USB and HDMI ports, preinstalled operating systems, and so forth.

The output generation module 114 may also access interaction data 118. Interaction data 118 may include purchase history data, search history data, browsing history data, clickstream data, and so forth, which may be indicative of items that were purchased, viewed, or otherwise accessed during previous user transactions where the particular item was purchased, viewed, or accessed. The interaction data 118 may be used to determine items that are comparable or similar to the item associated with the user input 106. For example, items that are consistently viewed or purchased by other users during sessions or transactions when the other users access "Laptop A" may be determined to be similar or comparable to "Laptop A". Continuing the example, the output generation module 114 may determine three other items (e.g., "Laptop B", "Laptop C", and "Laptop D") that are frequently accessed by other users during a transaction associated with "Laptop A".

In other implementations, the output generation module 114 may determine items that are comparable or similar to the item associated with the user input 106 based on the category of the items. For example, items having the same category (e.g., consumer electronics) and sub-category (e.g., laptop computers) as one another may be determined to be similar or comparable. In still other implementations, the output generation module 114 may determine items that are comparable or similar to the item associated with the user input 106 based on the attributes 116 associated with the items. For example, based on the item data 110, the output generation module 114 may determine that "Laptop A", "Laptop B", "Laptop C", and "Laptop D" each have associated values for the same or a similar set of attributes 116. In still other implementations, the output generation module 114 may determine items that are comparable or similar to the item associated with the user input 106 based on the values of the attributes 116 associated with the items. For example, based on the item data 110, the output generation module 114 may determine that the attribute values for "Laptop A", "Laptop B", "Laptop C", and "Laptop D" are within a threshold value of one another.

To determine the attributes 116 that are included in the output 102, the output generation module 114 may process at least a subset of the attributes 116 associated with the first item. For each attribute of the subset, the output generation module 114 may determine whether that attribute 116 is a generic attribute 116, common to all or most items, or an attribute 116 that is specific to one or more of the first item, the items similar to the first item, or the category associated with the first item. For example, the item data 110 associated with "Laptop A" may include an attribute value associated with packaging dimensions for shipping the item. However, the output generation module 114 may determine that 98% of the items available for sale include attribute values for packaging dimensions. Based on this determination, the output generation module 114 may determine that packaging dimensions is a generic attribute 116 that is not specific to the first item, the similar items, or the category associated with the first item. Therefore, the packaging dimensions may not be a useful attribute 116 when attempting to differentiate between similar items within the same category, and the packing dimensions may be excluded from a table or other output 102. In some implementations, the inclusion or exclusion of particular attributes 116 in an output 102 may be determined based on the size of a region within a user interface where the output 102 may be presented. For example, the output generation module 114 may access one or more threshold values indicative of a maximum size of an output 102 or a maximum number of attributes 116 or items to include within the output 102. Continuing the example, if a large region of a user interface associated with an item is unoccupied, a table may include a larger quantity of attributes 116. In other cases, a smaller region of a user interface may be available for presentation of the output 102. For example, the item data 110 for an item may include a large image or multiple images, a large quantity of alphanumeric data describing the item, and so forth. In such a case, a table may include a smaller quantity of attributes 116. In still other implementations, the output generation module 114 may be configured to position the output 102 proximate to a particular element, such as item data 110 relevant to a particular item. One or more of the size, color, font, or attributes 116 of items included in the output 102 may be modified based on the characteristics of unused portions of the user interface proximate to the particular element.

As another example, the item data 110 associated with "Laptop A" may include a value for an attribute 116 associated with a quantity of RAM. The output generation module 114 may determine that the quantity or percentage of items that include attribute values for a quantity of RAM to be less than a threshold quantity or percentage. For example, item data 110 may indicate values for the quantity of RAM for computing devices; however, the quantity of RAM would most likely not be indicated for other types of items, such as clothing, sporting goods, books, and so forth. Based on this determination, the output generation module 114 may determine that quantity of RAM is an attribute 116 that is specific to the first item, the similar items, or the category associated with the first item. Therefore, differences in quantity of RAM may be a useful attribute 116 when attempting to differentiate between similar computing devices, such as laptop computers.

To further determine the particular attributes 116 that are included in the output 102, the output generation module 114 may determine the quantity of item data 110 associated with particular attributes 116. For example, the output generation module 114 may determine that a quantity or percentage of items that include an attribute value for a quantity of HDMI ports is less than a threshold quantity or percentage of items. Continuing the example, a quantity of HDMI ports may be an attribute 116 specific to devices having display outputs, which would not be indicated for other types of items. Therefore, this determination may indicate that the quantity of HDMI ports included in a laptop computer is an attribute 116 that may be useful when comparing laptop computers. However, the item data 110 may not indicate attribute values associated with quantities of HDMI ports for a significant quantity of laptop computers. If the quantity or percentage of laptop computers that include attribute values for a quantity of HDMI ports is less than a minimum threshold quantity or percentage, this attribute 116 may be omitted from the output 102. For example, if 1600 laptops are offered for sale but only 200 of the laptops (e.g., 12.5%) include a value for a quantity of HDMI ports, this value may be excluded from a table due to the percentage of laptops having this value being less than a threshold percentage (e.g., 25%). Attributes 116 for which a significant number of items within a category lack a corresponding value may not be useful when attempting to compare similar items.

The output generation module 114 may also determine particular attributes 116 to include in the output 102 by determining the quantity of item data 110 indicating a particular value for certain attributes 116. For example, the output generation module 114 may determine that a quantity or percentage of laptop computers that include an attribute value for a quantity of USB ports include the same value. Continuing the example, 90% of the laptop computers available for sale may include two USB ports. If the quantity or percentage of items within a category that have a common value for an attribute 116 exceeds a maximum threshold quantity or percentage, that attribute may be excluded from the output 102. Attributes 116 for which a significant number of items within a category share the same value may not be useful when attempting to compare similar items. In some implementations, the output generation module 114 may determine the quantity of item data 110 indicating different values for certain attributes. For example, the output generation module 114 may determine that a quantity or percentage of laptop computers that include an attribute value for a hard drive size may each include a different value. If the quantity or percentage of items within a category that have a common value for an attribute 116 exceeds a maximum threshold quantity or percentage, that attribute may be excluded from the output 102. Attributes 116 for which a significant number of items within a category have a different value may not be useful when attempting to compare similar items.

In some implementations, the output generation module 114 may be configured to include certain attributes 116 in the output 102 independent of whether the attributes 116 are generic or specific attributes 116, the presence or absence of item data 110 associated with the attributes 116, or the values of the attributes 116 for various items. For example, the output generation module 114 may determine correspondence between particular attributes 116 and data indicative of core attributes 116 determined to be useful for comparisons of items independent of other characteristics of the core attributes 116. Continuing the example, the output 102 may include the price associated with each item even though price is an attribute 116 common to nearly every item, and even though many comparable items may have similar prices. As another example, the output 102 may include an average user rating associated with each item even though user ratings are an attribute 116 common to most items, and even though many items may have similar average user ratings. In some implementations, the core attributes 116 may be determined using one or more types of machine learning or data mining techniques. For example, user input 106 requesting the addition of a particular attribute 116 to an output 102 provided to a user device 104 may indicate that the particular attribute 116 is of importance when comparing the items represented in the output 102. If a quantity or weight of users the addition of an attribute 116 exceeds a threshold quantity or weight, the requested attribute 116 may become a core attribute 116 that is included in one or more of the outputs 102 independent of other factors.

In some implementations, the output generation module 114 may be configured to exclude certain attributes 116 from the output 102 independent of whether the attributes 116 are generic or specific attributes 116, the presence or absence of item data 110 associated with the attributes 116, or the values of the attributes 116 for various items. For example, the output generation module 114 may determine correspondence between particular attributes 116 and data indicative of attributes 116 to be excluded from outputs 102. Continuing the example, the materials included in the strings of tennis racquets may be an attribute 116 unique to tennis racquets. Therefore, item data 110 for this attribute 116 may be available for the majority of tennis racquets offered for sale, and the materials used in different tennis racquets may differ across various items. However, this particular attribute 116 may be generally unimportant to users comparing these items and may be excluded from the output 102. In some implementations, the excluded attributes 116 may be determined using one or more types of machine learning or data mining techniques. For example, user input 106 requesting the removal of a particular attribute 116 from an output 102 provided to a user device 104 or indicating disinterest in the particular attribute 116 may indicate that the particular attribute 116 is of low importance when comparing the items represented in the output 102. If a quantity or weight of users indicating disinterest in an attribute 116 exceeds a threshold quantity or weight, the requested attribute 116 may become an excluded attribute 116 that is excluded in one or more of the outputs 102 independent of other factors.

The resulting table or other output 102 may include item identifiers 120 indicative of each item and a set of attributes 116 associated with each item identifier 120. The attributes 116 may include one or more of the attributes 116 determined to be specific to the particular items shown in the output 102 or to the category associated with the items. For example, an output 102 comparing similar laptop computers may include attribute values associated with weight, processor speed, quantity of RAM, and quantity of data storage. The attributes 116 may also include one or more attributes 116 that are generic to many items, but that may be useful when comparing similar items, such as the average user rating or price associated with the items.

While FIG. 1 depicts a table generated with regard to a particular item (e.g., "Laptop A"), in other implementations, outputs 102 may be generated based on other portions of the item data 110. For example, an output 102 may be generated based on a particular attribute 116 or value of the attribute 116. Continuing the example, an output 102 may include multiple types of devices that each have a display area of a particular size (e.g., laptop computers, desktop computers, smart televisions, and so forth) to enable users to compare different devices that may be used to display media. As another example, an output 102 may be generated based on multiple items. For example, the user input 106 may include a search query identifying both a particular laptop computer and a particular desktop computer. An output 102 generated based on both of these items may include attributes 116 and similar items that would not have been identified by the output generation module 114 if the output 102 was generated based on only one of the particular items. For example, a particular notebook computer that includes various attributes 116 common to both the identified laptop and desktop computers may be included in a table comparing the particular laptop and desktop computer. However, when considering only the attributes 116 of the particular laptop computer, the notebook computer may not be determined to be a similar or comparable item.

Figure 2:
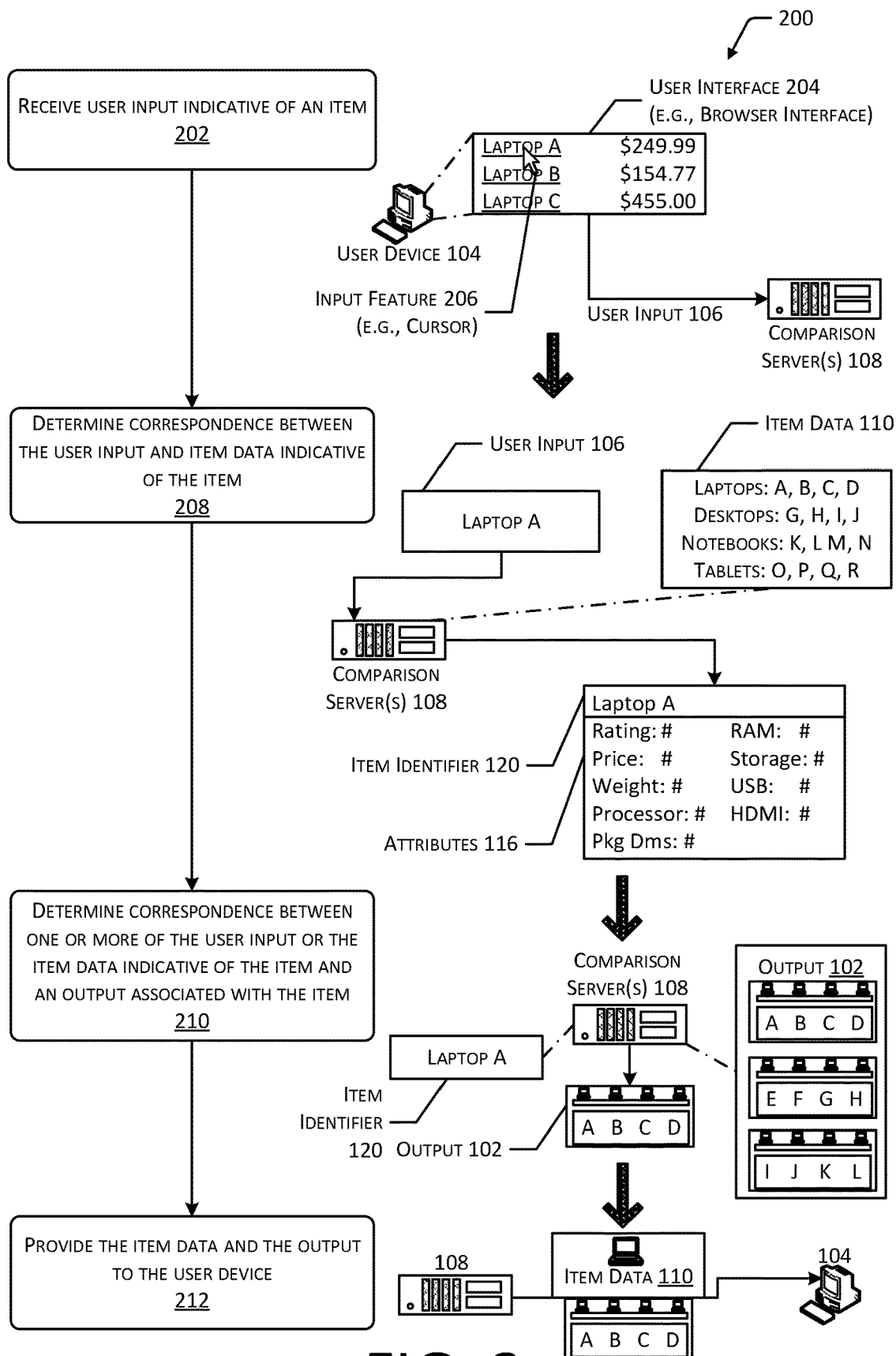
FIG. 2 depicts a scenario illustrating a method for determining and providing item data and an output, such as a table, responsive to a request from a user device.

FIG. 2 depicts a scenario 200 illustrating a method for determining and providing item data 110 and an output 102 responsive to a request from a user device 104. At 202, user input 106 indicative of an item may be received from a user device 104. For example, a user device 104 may present a user interface 204, such as a browser interface, to a user. The user interface 204 may include information regarding one or more items, such as a list of items, a list of item categories, a search interface, and so forth. The user device 104 may generate user input 106 by interacting with the user interface 204, such as through use of an input feature 206. For example, the input feature 206 may include a cursor associated with a mouse device, or one or more other types of input devices, such as a touch sensor, a keyboard, and so forth. Continuing the example, the input feature 206 may be used to indicate a particular item (e.g., "Laptop A"), and the user input 106 indicative of this item may be provided to the comparison server(s) 108.

At 208, the comparison server(s) 108 may determine correspondence between the user input 106 and item data 110 indicative of the selected item. For example, item data 110 associated with multiple items may be stored in association with the comparison server(s) 108. Continuing the example, the comparison server(s) 108 may be associated with an online marketplace offering a large variety of items associated with multiple categories. FIG. 2 depicts example item data 110 associated with multiple laptop computers, desktop computers, notebook computers, and tablet computers. In other implementations, the item data 110 may include data associated with any number and any type of items, including items wholly dissimilar from the selected item. For example, an online marketplace may offer consumer electronics, sporting goods, clothing, books, and so forth, for purchase, and item data 110 associated with each of these categories of items may be stored in association with the comparison server(s) 108. A request processing module 112 or other module(s) associated with the comparison server(s) 108 may determine particular item data 110 that corresponds to the item indicated by the user input 106. For example, the corresponding item data 110 may include an item identifier 120 indicative of the selected item and one or more attributes 116 that correspond to the selected item. FIG. 2 depicts example attributes 116 including a user rating, price, weight, processor speed, packaging dimensions, quantity of RAM, quantity of data storage, quantity of USB ports, and quantity of HDMI ports associated with "Laptop A". In other implementations, the attributes 116 may include any number and any type of features associated with an item, including materials, textures, colors, location of manufacture, identity of manufacturer, identity of shipper, and so forth.

At 210, the comparison server(s) 108 may determine correspondence between one or more of the user input 106 or the item data 110 indicative of the item, and an output 102 (e.g., a table) associated with the item. For example, multiple tables or other outputs 102 may be stored in association with the comparison server(s) 108, each output 102 associated with a particular item or a particular attribute 116. The request processing module 112 or another module associated with the comparison server(s) 108 may determine a particular output 102 that corresponds to the item indicated by the user input 106. In another implementation, the request processing module 112 or another module associated with the comparison server(s) 108 may determine a particular output 102 that corresponds to the item indicated by the item data 110 determined at 208. For example, one or more outputs 102 may have an item identifier 120 associated therewith. The comparison server(s) 108 may determine an output 102 that includes an item identifier 120 corresponding to the item identifier 120 of the item data 110 determined at 208.

At 212, the comparison server(s) 108 may provide the item data 110 and the output 102 to the user device 104 from which the user input 106 was received. In some implementations, the request processing module 112 or another module associated with the comparison server(s) 108 may process, format, render, or otherwise modify one or more of the item data 110 or the output 102 for presentation to the user device 104. For example, the item data 110 may be presented on the user device 104 as a webpage that includes an item name, one or more images of the item, one or more descriptions of the item, one or more of the attributes 116, descriptions of item features or attributes 116, the item identifier 120, and so forth. The output 102 may be provided within the webpage. In other implementations, the output 102 may be separately accessible via a link, a separate window, a mouseover feature, and so forth. While FIG. 2 depicts a table, in other implementations, other types of output 102 in addition to or in place of a table may be provided. For example, certain types of computing devices may be configured to provide audio output 102 to a user, such as devices lacking a display. As another example, certain types of computing devices may be configured to provide haptic or tactile output 102, such as devices for outputting braille.

Figure 3:
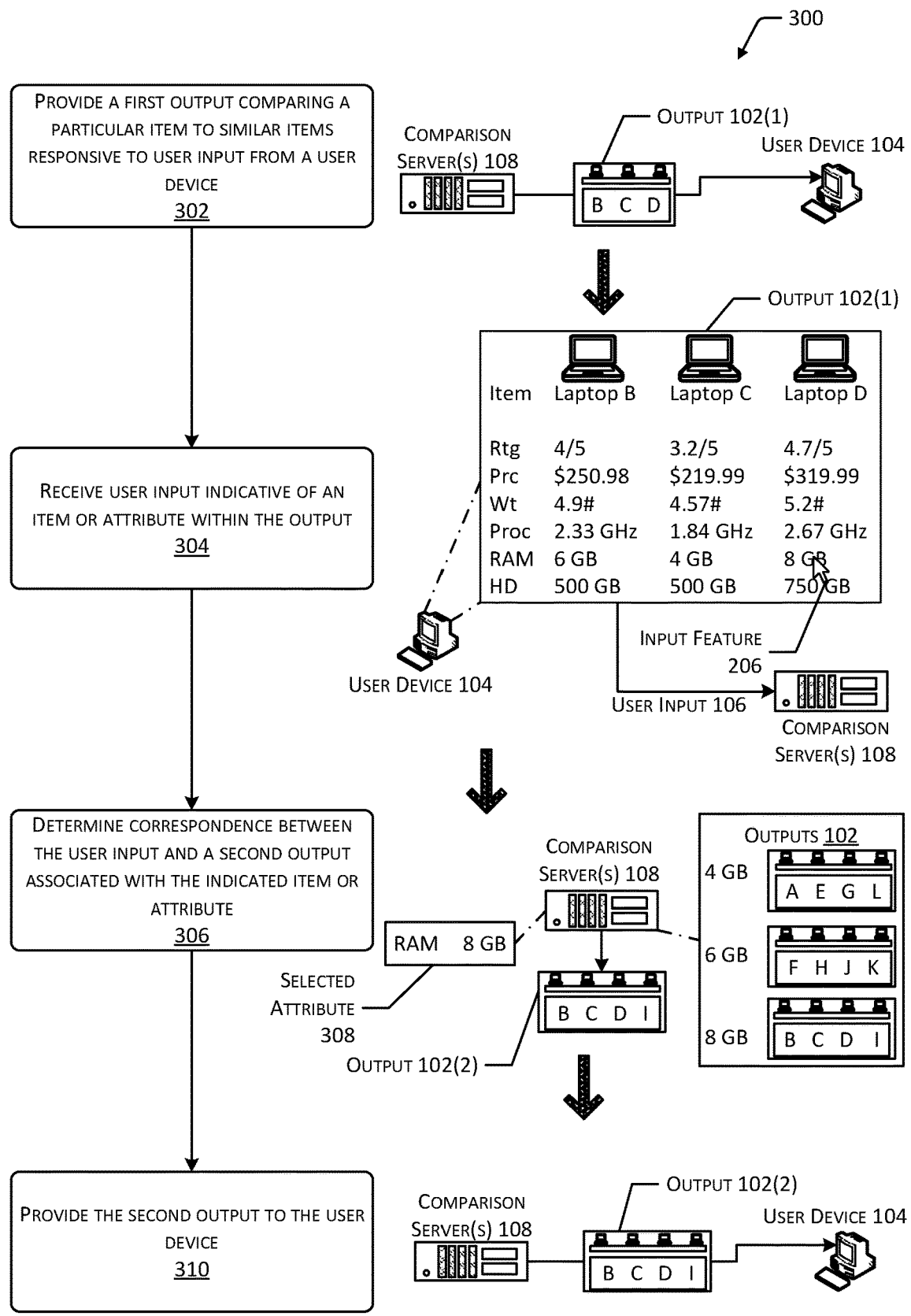
FIG. 3 depicts a scenario illustrating a method for providing additional outputs, such as tables, to a user device responsive to user input interacting with a first output.

FIG. 3 depicts a scenario 300 illustrating a method for providing additional outputs 102, such as tables, to a user device 104 responsive to user input 106 interacting with a first output 102(1). At 302, a first output 102(1) that compares a particular item to similar items may be provided to a user device 104, responsive to user input 106 from the user device 104. As described previously with regard to FIG. 2, user input 106 may include a search query, a selection of a link, advertisement, other feature via a user interface 204, and so forth. A request processing module 112 or another module associated with the comparison server(s) 108 may determine correspondence between the item indicated by the user input 106 and one or more outputs 102 stored in association with the comparison server(s) 108. The first output 102(1) may correspond to the item indicated by the user input 106. For example, the user input 106 may include a search query or selection of "Laptop B", and the first output 102(1) may include a table that compares attribute values for "Laptop B" with those of other items (e.g., "Laptop C" and "Laptop D"). In other implementations, the user input 106 may include a search query that includes particular keywords, and the first output 102(1) may compare items that correspond to at least a portion of the search results. For example, the user input 106 may include a search query having the keyword string "laptop computers". The request processing module 112 may determine one or more search results that correspond to this search query. The first output 102(1) presented responsive to the user input 106 may compare attribute values for a selected quantity (e.g., from three to five) of the best-selling laptop computers associated with the comparison server(s) 108. As other examples, the first output 102(1) may compare attribute values for a selected quantity of laptop computers having the highest average user rating, the highest prices, the lowest prices, the highest or lowest values for a particular attribute 116, and so forth.

At 304, user input 106 indicative of an item or attribute 116 within the first output 102(1) may be received by the comparison server(s) 108. For example, a user associated with the user device 104 to which the first output 102(1) is presented may indicate a particular attribute value displayed in the first output 102(1) using an input feature 206, such as a cursor associated with a mouse device, a touch sensor, a keyboard, and so forth. Continuing the example, the user input 106 may include selection of the attribute value "8 GB" for the quantity of RAM associated with "Laptop D".

At 306, the comparison server(s) 108 may determine correspondence between the user input 106 and a second output 102(2) associated with the indicated item or attribute 116. For example, the comparison server(s) 108 may determine correspondence between the selected attribute 308 (e.g., "8 GB" for the quantity of RAM) indicated by the user input 106 and one or more tables or other types of output 102 stored in association with the comparison server(s) 108. As described previously with regard to FIG. 1, while some outputs 102 may be associated with particular items, other outputs 102 may be associated with particular attributes 116 or particular attribute values. For example, FIG. 3 depicts the stored outputs 102 including tables associated with the attribute values "4 G B", "6 G B", and "8 G B".

The comparison server(s) 108 may determine that the second output 102(2) corresponds to the selected attribute 308. At 310, the comparison server(s) 108 may provide the second output 102(2) to the user device 104. For example, the second output 102(2) may include a table comparing multiple laptop computers having the value "8 GB" for the quantity of RAM to facilitate a comparison between different laptop computers that share this attribute value. In a similar manner, other outputs 102 that compare items that share other attribute values may be provided to user devices 104 responsive to user input 106 indicating other attributes 116.

In some implementations, an output 102 may be associated with a particular range of attribute values. For example, responsive to user input 106 indicating a display size of 14 inches for a laptop computer, the comparison server(s) 108 may determine a corresponding table or other output 102 that compares laptop computers having a display size ranging from 12 inches to 16 inches. In other implementations, user input 106 may indicate a particular item within an output 102 rather than an attribute 116. For example, the user input 106 may include selection of one of the similar items, such as "Laptop C", using the input feature 206. Responsive to selection of an item, the comparison server(s) 108 may determine a corresponding output 102 that compares attribute values of "Laptop C" to those of similar laptop computers, such as by using the process described with regard to FIG. 2.

Figure 4:
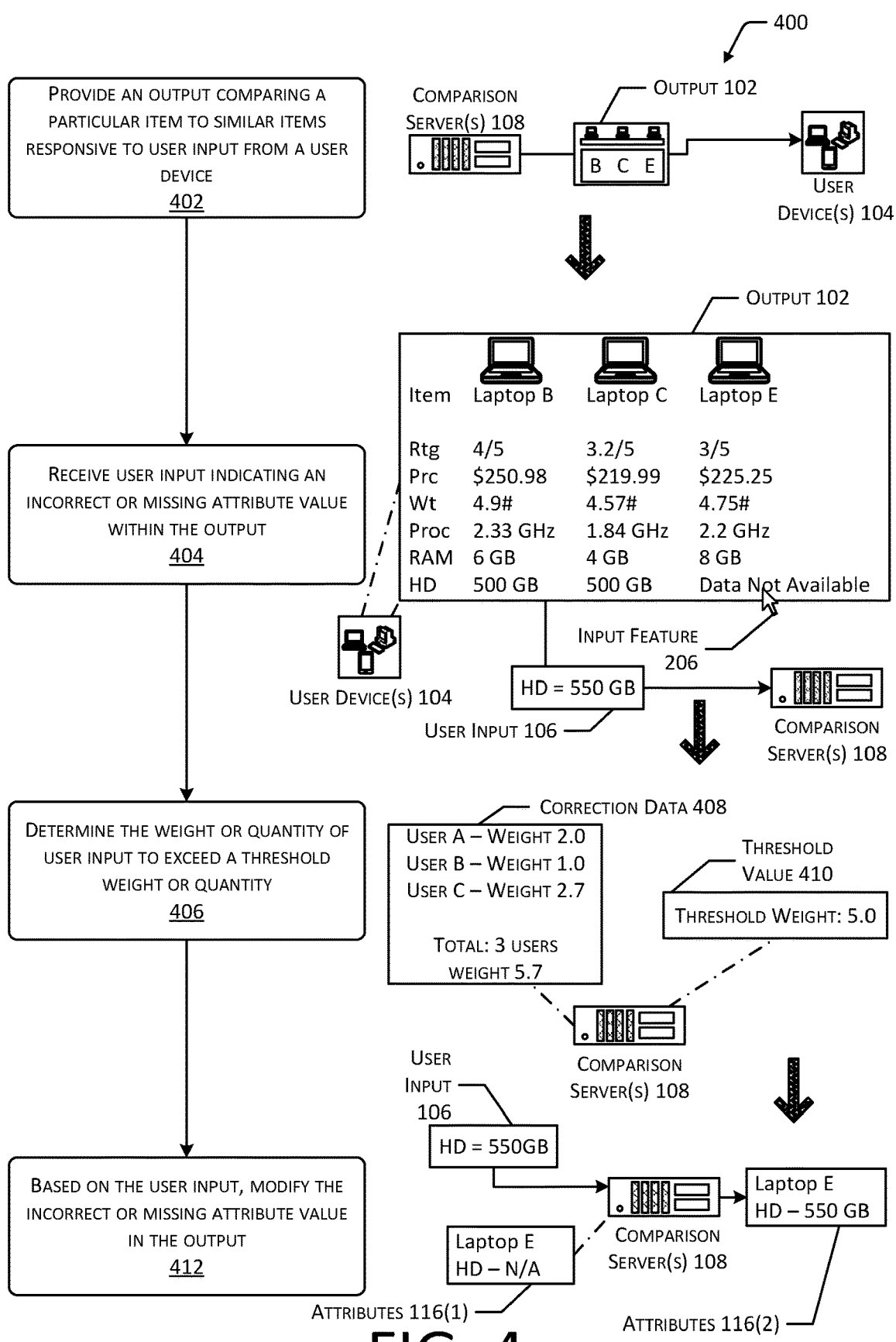
FIG. 4 depicts a scenario illustrating a method for modifying a table or other type of output based on user input corresponding to an incorrect or missing attribute value.

FIG. 4 depicts a scenario 400 illustrating a method for modifying a table or other type of output 102 based on user input 106 corresponding to an incorrect or missing attribute value. At 402, an output 102 that compares a particular item to similar items may be provided to a user device 104, responsive to user input 106 from the user device 104. In some implementations, a value for one or more attributes 116 may not be available for each item included in an output 102. For example, a particular attribute 116 may be useful for comparing items within a particular category, and the quantity or percentage of items having associated values for the particular attribute 116 may exceed a minimum threshold quantity or percentage, causing the particular attribute 116 to be included in the output 102. However, a particular item determined to be similar to the item associated with the user input 106 may lack a corresponding value for the particular attribute 116. The output 102 may therefore include an indication of the absent attribute value, such as a blank space, a symbol corresponding to a lack of an attribute value, an indication of unavailable data such as "Data Not Available" and so forth. For example, FIG. 4 depicts a table comparing three items, "Laptop B", "Laptop C", and "Laptop E". For "Laptop E", a value for the quantity of data storage (e.g., "HD") is not present, as indicated by the notation "Data Not Available".

At 404, user input 106 indicating an incorrect or missing attribute value within the output 102 may be received. For example, a user associated with a user device 104 may indicate a portion of a table associated with a missing attribute value for a particular item using an input feature 206. The user input 106 may also include an indication of a value corresponding to the attribute 116 for the particular item. For example, the user input 106 may include alphanumeric data, such as a number indicative of a size of a data store, input by a user. As another example, the user input 106 may include selection of one or more options from a list or menu. Continuing the example, responsive to user input 106 indicating a portion of an output 102 that corresponds to a size of a data store, the user device 104 may be provided with a list or menu that includes multiple possible sizes of data stores. Additional user input 106 may include selection of one or more of the possible sizes. Other example methods by which user input 106 may be used to modify stored data associated with one or more items are described in U.S. Pat. No. 8,688,508, which is incorporated by reference herein in its entirety. Continuing the example, after selecting the portion of the output 102 corresponding to the missing attribute value, the user associated with the user device 104 may input a value that corresponds to the attribute 116 for the particular item. In the example depicted in FIG. 4, a user may select the "Data Not Available" indication within the table using a mouse device, touch sensor, or other type of input device. The user may then input a value for the missing attribute value, such as "550 GB", by using a keyboard, touch sensor, or other input device. In some implementations, multiple user devices 104 may interact with the output 102 in this manner, providing user input 106 that includes suggested values for missing attribute values.

In other implementations, the user input 106 may indicate a portion of the output 102 corresponding to an attribute value that is present but that the user may believe to be incorrect. For example, a user may purchase a laptop computer indicated in the output 102 as having "500 GB" of data storage. However, the user may determine that the purchased laptop computer includes 550 GB of data storage. The user may access the output 102 using the user device 104, select the portion of the output 102 that corresponds to the attribute value "500 GB" for the purchased laptop, and provide user input 106 indicating a replacement value of 550 GB.

At 406, the quantity of user input 106 or a weight associated with the user input 106 may be determined to exceed a threshold weight or quantity. For example, user input 106 suggesting an attribute value to replace a missing or incorrect value may be received from multiple user devices 104. If the quantity of user devices 104 from which the user input 106 is received exceeds a minimum threshold quantity, the output 102 may be modified to include the suggested replacement value. As another example, user accounts associated with user devices 104 may be provided with a particular weight. Continuing the example, user accounts that have a history of accurately reporting errors or supplementing missing attribute values in outputs 102 may be provided with a greater weight than user accounts lacking such a history or that have a history of providing inaccurate attribute values. If the total weight associated with a suggested replacement value exceeds a minimum threshold weight, the output 102 may be modified to include the suggested replacement value.

FIG. 4 depicts an example in which correction data 408, determined from the user input 106, indicates three user accounts and corresponding weights associated with user input 106 that includes a replacement attribute value. The comparison server(s) 108 may determine that the total weight (e.g., 5.7) associated with the correction data 408 exceeds a threshold value 410 (e.g., a threshold weight of 5.0). At 412, based on the user input 106, the incorrect or missing attribute value in the output 102 may be modified. For example, the initial attributes 116(1) associated with "Laptop E" may not indicate a value for quantity of data storage in the output 102. The comparison server(s) 108 may modify the initial attributes 116(1) based on the user input 106, such that the resulting attributes 116(2) in the output 102 include a value of "550 GB" for quantity of data storage.

Figure 5:
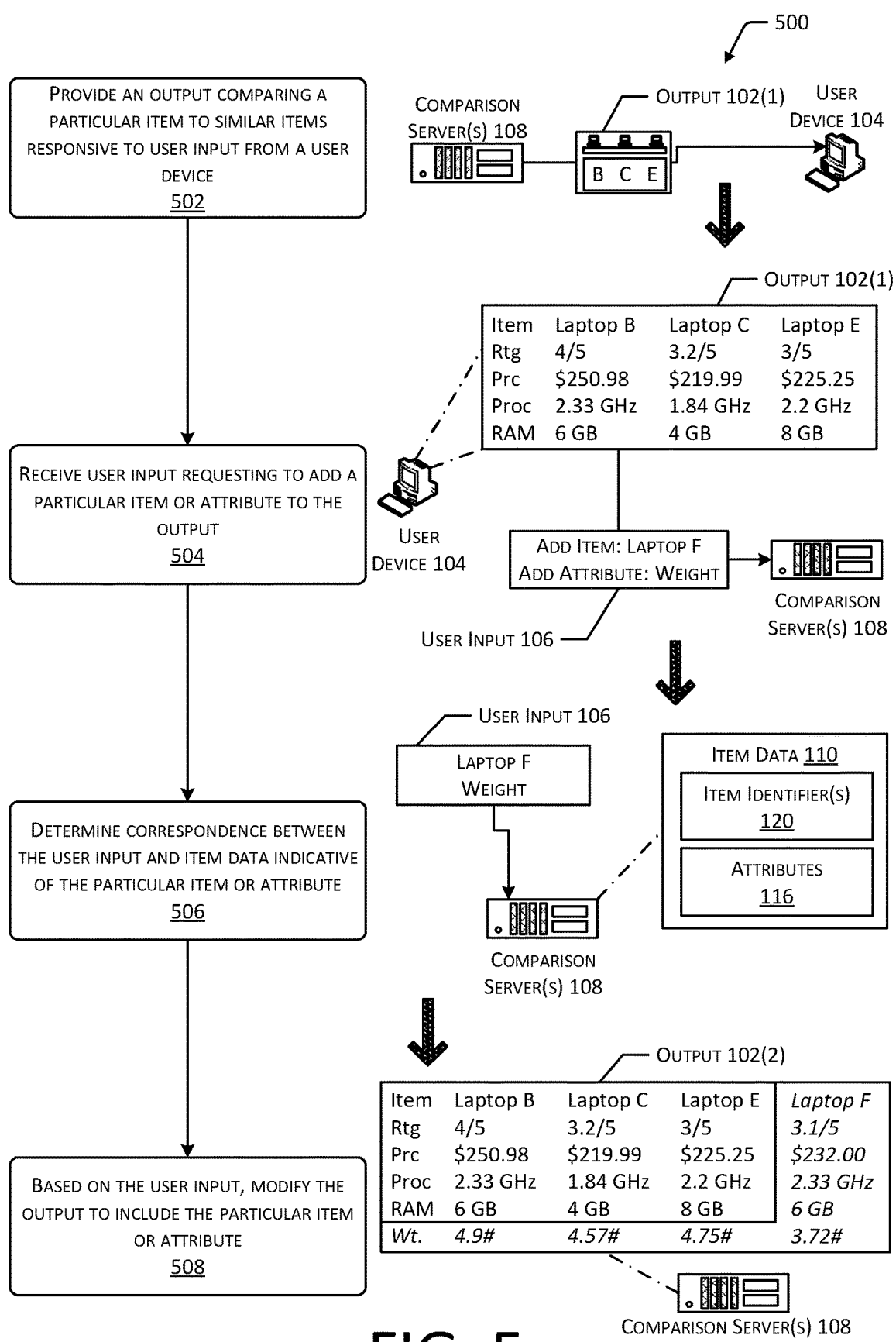
FIG. 5 depicts a scenario illustrating a method for modifying a table or other type of output based on user input requesting the addition of one or more items or attributes to the output.

FIG. 5 depicts a scenario 500 illustrating a method for modifying a table or other output 102 based on user input 106 requesting the addition of one or more items or attributes 116 to the output 102. At 502, a first output 102(1) that compares a particular item to similar items may be provided to a user device 104, responsive to user input 106 from the user device 104. As described previously with regard to FIGS. 1 and 2, an output generation module 114 or another module associated with the comparison server(s) 108 may determine the specific items that are similar or comparable to a particular item and the particular attributes 116 that are likely to be useful when comparing the similar items. The first output 102(1) corresponding to an item indicated by the user input 106 may therefore include similar items and attributes 116 determined automatically by the comparison server(s) 108. For example, the first output 102(1) may include at least a portion of a previously generated output 102 associated with the particular item that is retrieved and presented to a user device 104 responsive to user input 106 indicating the particular item. FIG. 5 depicts an example first output 102(1) that includes a table comparing three items, "Laptop B", "Laptop C", and "Laptop E". The example first output 102(1) includes values for four attributes 116: an average user rating ("Rtg"), a price ("Prc"), a processor speed ("Proc"), and a quantity of RAM ("RAM").

At 504, user input 106 requesting to add a particular item or a particular attribute 116 to the output 102 may be received. For example, by accessing a browser interface presenting the output 102 or another type of user interface 204, a user associated with the user device 104 may provide user input 106 indicating particular items or attributes 116 that the user may also seek to compare using the output 102. Continuing the example, the user input 106 may indicate an additional item (e.g., "Laptop F") and an additional attribute (e.g., "Weight"). In other implementations, the user input 106 may indicate removal of one or more items, one or more attributes 116, or both items and attributes 116. For example, a user may find that a particular attribute is not useful when comparing similar items, or that a particular item included in an output 102 is not similar or comparable to the other items. The user input 106 received from the user device 104 may indicate a particular item or attribute 116 to be removed from the output 102, such as by selecting a particular row or column corresponding to an attribute 116, a heading or identifier associated with the attribute 116, and so forth.

At 506, the request processing module 112 or another module associated with the comparison server(s) 108 may determine correspondence between the user input 106 and item data 110 indicative of the particular item or attribute 116. For example, responsive to the user input 106 indicative of the addition of the attribute 116 for "Weight", the comparison server(s) 108 may determine, based on the item data 110, attribute values for the "Weight" attribute 116 associated with each of the items (e.g., "Laptop B", "Laptop C", and "Laptop E") presented in the first output 102(1). Responsive to the user input 106 indicative of the additional item "Laptop F", the comparison server(s) 108 may determine attribute values corresponding to the item identifier 120 associated with "Laptop F", including the four attribute values initially displayed in the output 102 as well as the additional "Weight" attribute 116.

At 508, based on the user input 106, the first output 102(1) may be modified to include the particular item or attribute 116 indicated by the user input 106. For example, the determined attribute values for the additional item and the additional attribute 116 may be added to the first output 102(1) to form a modified second output 102(2). The modified second output 102(2) may be provided to the user device 104 for presentation.

In some implementations, the output generation module 114 or another module associated with the comparison server(s) 108 may use one or more machine learning algorithms to modify the stored first output 102(1), or other outputs 102 stored in association with the comparison server(s) 108, based on user input 106. For example, multiple user accounts may request the addition of a particular item or attribute 116 to a table or other output 102. If a quantity of user accounts or a weight associated with the user accounts exceeds a threshold quantity or weight, the output 102 may be modified to include the added item or attribute 116. Continuing the example, frequent user requests to add "Laptop F" to a table that includes "Laptop B", "Laptop C", and "Laptop E" may indicate that "Laptop F" is a similar or comparable item. As another example, frequent user requests to remove "Laptop C" or another item may indicate that the item is not similar to the other items in the output 102. As yet another example, frequent user requests to add attribute values such as weight or quantity of data storage to an output 102 may indicate that these attributes 116 are useful when comparing similar items. Frequent user requests to remove a particular attribute 116 from an output 102 may indicate that the attribute 116 is not useful.

In some implementations, user input 106 may be used not only to modify the particular outputs 102 responsive to which the user input 106 is received, but also other outputs 102. For example, frequent user requests to add attribute values for the display size of a cellular telephone may cause the output generation module 114 or another module associated with the comparison server(s) 108 to modify multiple outputs 102 that include cellular telephones to also include the display size attribute 116. Continuing the example, if the quantity or weight of the user requests is determined to exceed a minimum threshold quantity or weight, this determination may indicate that display size is a useful attribute 116 when comparing cellular telephones.

Figure 6:
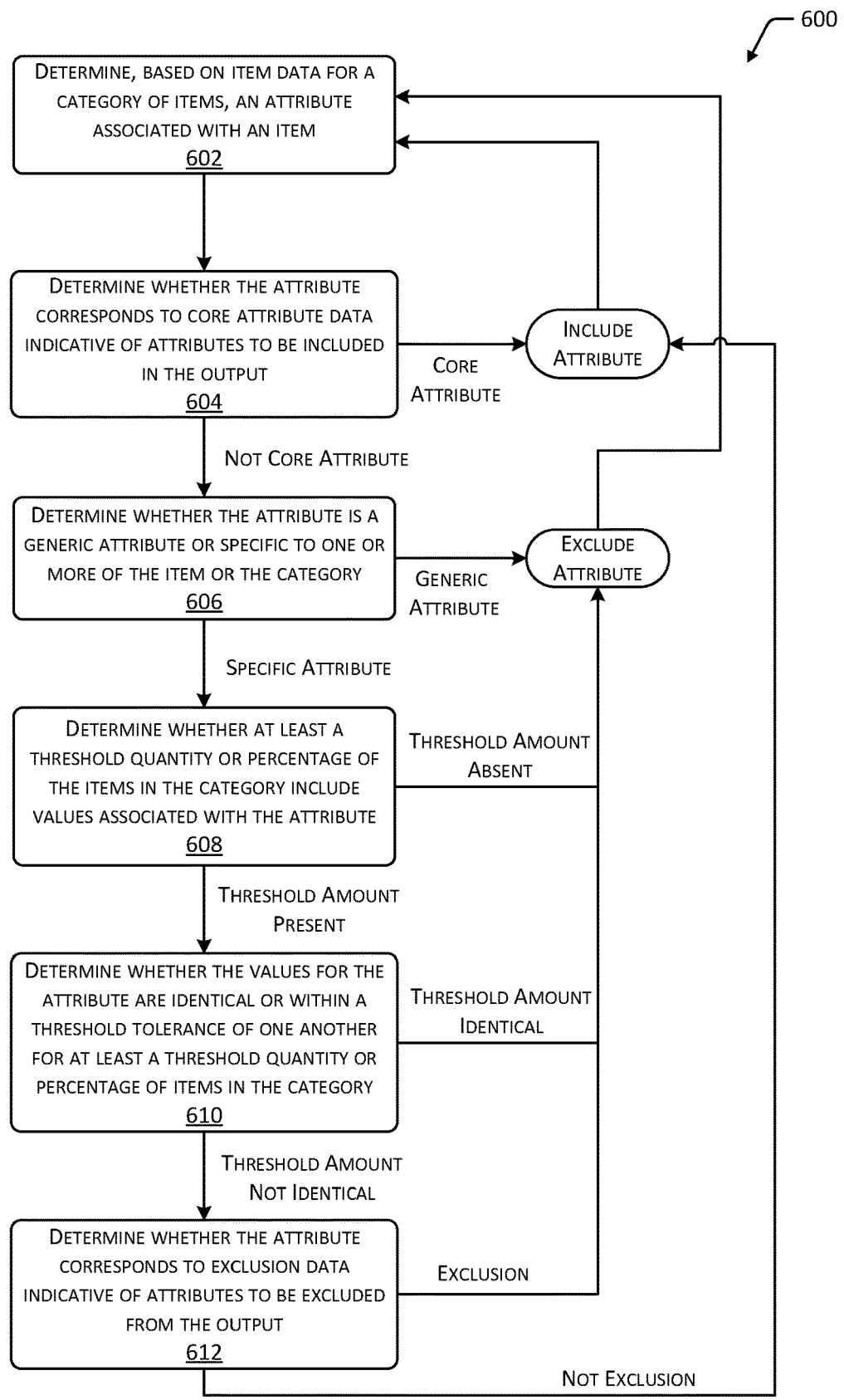
FIG. 6 is a flow diagram illustrating a method for generating tables or other types of output by including or excluding attributes associated with items within a category.

FIG. 6 is a flow diagram 600 illustrating a method for generating tables or other types of output 102 by including or excluding attributes 116 associated with items within a category. Block 602 determines, based on item data 110 for a category of items, an attribute 116 associated with an item. The category for which the item data 110 is determined may include a broad category pertaining to multiple types of items or a sub-category pertaining to a specific type of items. For example, an output generation module 114 or other module associated with the comparison server(s) 108 may determine item data 110 associated with a category, such as electronics, or a sub-category, such as laptop computers. The comparison server(s) 108 may determine a portion of the item data 110 that corresponds to a particular item. For example, the portion of the item data 110 may include an item identifier 120 indicative of the particular item and one or more attributes 116 associated with the item. Based on that item data 110 for the particular item, the comparison server(s) 108 may determine a particular attribute 116 associated with the item.

In some implementations, item data 110 may include data received from a vendor or other entity associated with particular items. For example, a vendor may provide item data 110 indicative of the values of various attributes 116 for items available for sale. In other implementations, item data 110 may include data determined from third party sources related to an item. For example, users that purchase an item may provide reviews associated with the item. The output generation module 114 or another module associated with the comparison server(s) 108 may analyze review data indicative of the reviews to determine particular terms indicative of one or more attributes 116. For example, reviews may indicate that an item is "durable", "good for children", "easy to assemble", and so forth. In some implementations, a user interface 204 provided to users for receiving reviews of an item may include lists, menus, or other means by which a user may select particular attributes 116.

Block 604 determines whether the attribute 116 corresponds to core attribute data indicative of attributes 116 to be included in the output 102 independent of other characteristics of the attributes 116. Attributes 116 that correspond to the core attribute data may be included in the output 102, while attributes 116 that do not correspond to the core attribute data may be processed as described below with regard to blocks 606 through 612. For example, certain attributes 116 may be included in an output 102 independent of whether the attributes 116 are generic to all items or specific to a particular item or category. The certain attributes 116 may also be included independent of the particular values associated with the attributes 116. Continuing the example, the price and average user rating of an item may be included in a table or other type of output 102 associated with the item, independent of the fact that price and user rating are attributes 116 associated with the large majority of items available for purchase. The price and user rating may also be included independent of the particular values associated with the price or user rating. For example, over 99% of the items available for purchase in an online marketplace may include a price. Many items within a particular category may have a similar price. Continuing the example, a large quantity of laptops available for purchase may have a price ranging from $450 to $500. While some attributes 116 may be excluded from an output 102 based on these factors, price may be characterized as a core attribute 116 that may be included in an output 102 independent of other factors. In some implementations, the core attribute data may be determined at least partly using one or more types of machine learning or data mining techniques. For example, user input 106 selecting particular attributes 116, as described with regard to FIG. 3 or user input 106 indicating particular attributes 116 to be added to an output 102, as described with regard to FIG. 4 may indicate particular attributes 116 of importance to one or more users. Continuing the example, based on the quantity of user accounts or a weight associated with the user accounts that indicate particular attributes 116, one or more of the particular attributes 116 may be added to the core attribute data and included in one or more outputs 102 independent of other factors.

In some implementations, other steps, such as those described in blocks 606 through 612, may not be performed for attributes 116 that correspond to the core attribute data. Because the attributes 116 correspond to the core attribute data, the attributes 116 may be included in the output 102 without further analysis. In other implementations, block 604 may be performed after one or more of the other steps described in blocks 606 through 612. For example, prior to excluding an attribute 116 from the output 102 based on a determination made in blocks 606 through 612, the comparison server(s) 108 may determine whether that attribute 116 corresponds to the core attribute data. If correspondence between the attribute 116 and the core attribute data is determined, the attribute 116 may be included in the output 102 independent of the determinations associated with blocks 606 through 612.

Block 606 determines whether the attribute 116 is a generic attribute 116 or specific to one or more of the item or the category. As described previously, some attributes 116 may be generic to most items. For example, most items may include an attribute value associated with packaging dimensions. In many cases attributes 116 that are generic to a large quantity or percentage of items (with the exception of attributes that correspond to the core attribute data) may not be useful for comparing similar items. Other attributes 116 may be specific or unique to a particular item or to a particular category of items. For example, an attribute value for audio power may be specific to speaker systems and devices that include speakers. As another example, an attribute value for quantity of RAM may be specific to computing devices. Attributes 116 that are specific to a particular category of items may be useful for determining the similarities and differences between items within the category.

To determine whether an attribute 116 is a generic attribute 116 or specific to an item or category, the output generation module 114 or another module associated with the comparison server(s) 108 may determine correspondence between item data 110 indicative of a particular attribute 116 and a threshold value 410. If the quantity of items or percentage of items available for purchase that include a value for the particular attribute 116 exceeds a maximum threshold quantity or percentage, then the attribute 116 may be determined to be a generic attribute 116. If the quantity of items or percentage of items available for purchase that include a value for the particular attribute 116 is less than the maximum threshold quantity or percentage, then the attribute 116 may be determined to be specific to a particular item or category.

Block 608 determines whether at least a threshold quantity or percentage of the items within the category include values associated with the particular attribute 116. For example, the output generation module 114 or another module associated with the comparison server(s) 108 may determine a particular quantity or percentage of items within a category that include a value for the particular attribute 116. If the quantity or percentage of items within the category that include an attribute value is less than a minimum threshold quantity or percentage, the particular attribute 116 may be excluded from the output 102. Attributes 116 for which a significant number of items within a category lack a corresponding value may not be useful when attempting to compare similar items. If the quantity or percentage of items that include a value for a particular attribute 116 is greater than a minimum threshold quantity or percentage, the particular attribute 116 may be included in the output 102.

Block 610 determines whether the values for the particular attribute 116 are identical or within a threshold tolerance of one another for at least a threshold quantity or percentage of items within the category. For example, the output generation module 114 or another module associated with the comparison server(s) 108 may determine the values for a particular attribute 116 for at least a subset of the items within a category. The comparison server(s) 108 may determine that for a particular quantity or percentage of items, the values for the attribute 116 are identical or within a threshold quantity or percentage of each other. For example, numerous laptop computers may have a display screen measuring 14 inches. Thus, the attribute value for the display screen size would be identical for a large number of laptop computers. As another example, numerous televisions may have a display size ranging from 52 to 56 inches. Thus, the attribute value for the display size would be within a threshold tolerance for a large number of televisions. If many items within a category include the same value or a similar value for an attribute 116, this attribute 116 may not be useful when comparing similar items within the category. If the quantity or percentage of items for which an attribute value is identical or similar exceeds a maximum threshold quantity or percentage, the attribute 116 may be excluded from the output 102. If the quantity or percentage of items for which an attribute value is identical or similar is less than the maximum threshold quantity or percentage, the attribute 116 may be included in the output 102.

In some implementations, block 610 may also determine whether the values for the particular attribute 116 differ among a quantity or percentage of items that exceeds a threshold quantity or percentage of items within the category. For example, if every item within a category includes a different value for a particular attribute 116, the particular attribute 116 may be unsuitable for comparison and may be excluded from one or more outputs 102. Continuing the example, each item within a category may include a different model number. However, the model number for each item may not be useful when comparing the items using a table or other type of output 102. As another example, if values for an attribute 116 differ for a quantity or percentage of items that exceeds a threshold quantity or percentage, this may indicate that one or more values for the attributes 116 are not normalized. Continuing the example, a first computer having a hard drive with an indicated size of 1024 GB and a second computer having a hard drive with an indicated size of 1 terabyte (TB) may be determined to include different values for this attribute 116. In some implementations, responsive to a difference in values for an attribute 116 that exceed a threshold quantity or percentage, the values for the attribute 116 may be analyzed and normalized.

Block 612 determines whether the attribute 116 corresponds to exclusion data indicative of attributes 116 to be excluded from the output 102. For example, certain attributes 116 may be excluded from a table or other output 102 independent of whether the attributes 116 are generic or specific to particular items or categories, the values of the attributes 116, or the presence or absence of item data 110 associated with the attributes 116. Continuing the example, particular attributes 116 for an item or category may be determined to be less useful or non-useful when performing a comparison between similar items. In other implementations, block 612 may be performed prior to one or more of the other steps described in blocks 604 through 610. For example, if correspondence between the attribute 116 and the exclusion data is determined, the attribute 116 may be excluded from the output 102 without performing the determinations associated with block 604 through block 610. In some implementations, the exclusion data may be determined at least partly using one or more types of machine learning or data mining techniques. For example, user input 106 may include a request to remove particular attributes 116 from an output 102 or an indication of a lack of interest in one or more attributes 116. Continuing the example, based on the quantity of user accounts or a weight associated with the user accounts that indicate a lack of interest in particular attributes 116, one or more of the particular attributes 116 may be added to the exclusion data and excluded from one or more outputs 102 independent of other factors.

After determining whether a particular attribute 116 is to be included in or excluded from an output 102, the output generation module 114 or another module associated with the comparison server(s) 108 may repeat the process depicted in FIG. 6 for other attributes 116. If each attribute 116 associated with an item has been processed, the process depicted in FIG. 6 may be repeated for subsequent items. If each item within a category has been processed, the process depicted in FIG. 6 may be repeated for subsequent categories. In some implementations, when an attribute 116 is excluded from an output 102, the output generation module 114 may generate a notification indicative of the rationale for exclusion of the attribute 116. For example, if a particular attribute 116 is excluded due to 90% of the items within a category having a common value for the attribute 116, the notification may include alphanumeric data or a particular code corresponding to this rationale for exclusion.

In some implementations, the item data 110 may be modified. For example, data associated with one or more additional items may be provided from a vendor or other entity to the comparison server(s) 108. Continuing the example, a vendor may begin offering a new item for sale that was not previously available, and the modified item data 110 may include attribute values and other data associated with the new item. As another example, data associated with one or more existing items may be removed. Continuing the example, a vendor may discontinue offering a particular item for sale. As yet another example, data associated with one or more attributes 116 of an item may be added, removed, or changed. Continuing the example, a vendor may add to the description of item features, change attribute values due to modifications to the item or to replace inaccurate values, or remove attribute values that the vendor no longer wishes to disclose.

The process described in FIG. 6 may be repeated responsive to a modification to the item data 110, which may result in modification(s) to one or more tables or other outputs 102, or the deletion or addition of one or more outputs 102. In other implementations, the process described in FIG. 6 may be performed periodically or continuously to add, remove, or update outputs 102 based on the most current item data 110.

Figure 7:
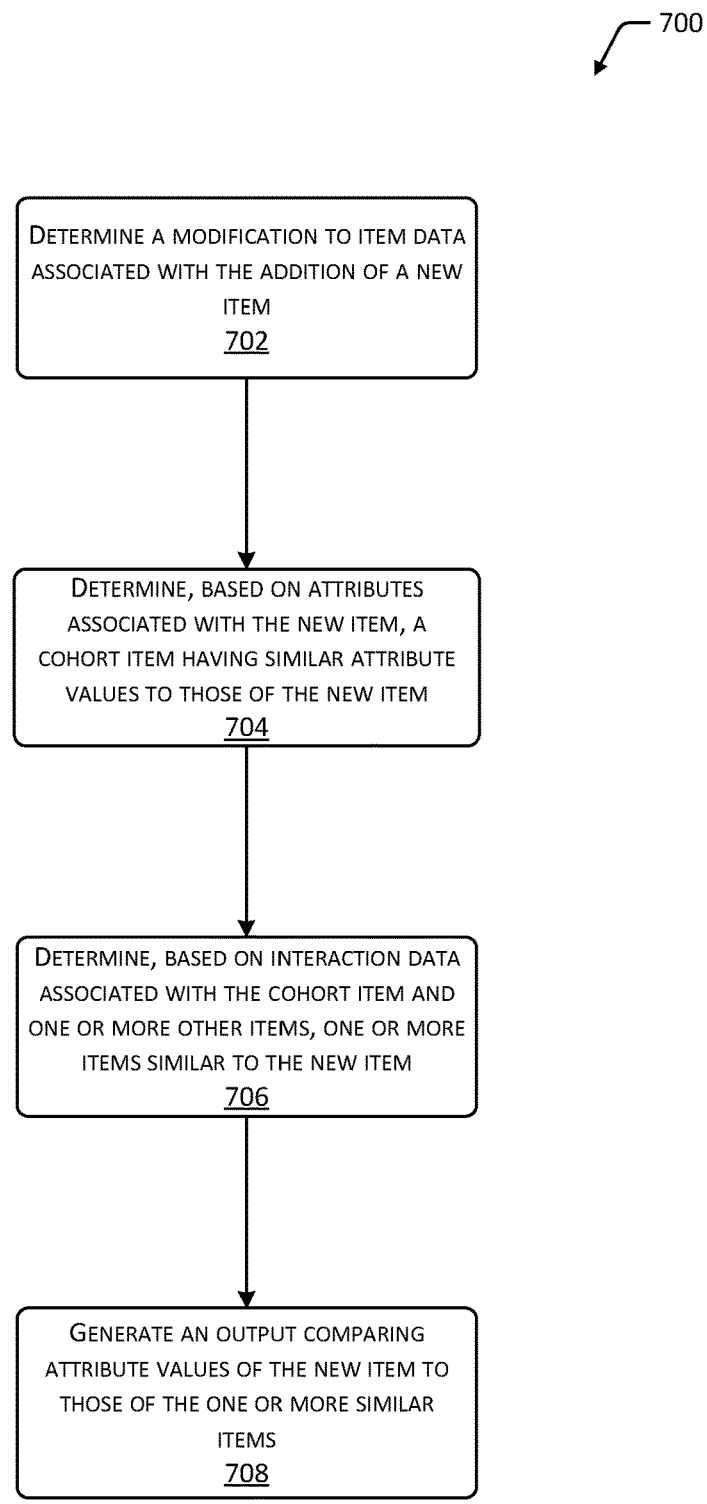
FIG. 7 is a flow diagram depicting a method for generating tables or other types of output associated with new items for which purchase history data or other types of interaction data may not exist.

FIG. 7 is a flow diagram 700 depicting a method for generating tables or other types of output 102 associated with new items for which interaction data 118 may not exist. Block 702 determines a modification to item data 110 associated with the addition of a new item. For example, a vendor may begin offering a new item for sale and may provide item data 110 indicative of that item to the comparison server(s) 108 or another computing device associated with an online marketplace. As described previously, with regard to FIG. 1, interaction data 118 may be used to determine items that are comparable or similar to a particular item. The comparable or similar items may be included in an output 102 associated with the particular item. However, a newly added item may not include interaction data 118. As a result, the newly added item may not be included in an output 102, which may artificially reduce sales of the new item while depriving users of the benefit of including the new item in a comparison.

Block 704 determines, based on attributes 116 associated with the new item, an existing item having similar attribute values to those of the new item (e.g., a "cohort item"). For example, the output generation module 114 or another module associated with the comparison server(s) 108 may determine correspondence between the attribute values associated with the new item and those associated with one or more other items. Continuing the example, a new item having a similar price and other similar attributes to those of an existing item may be expected to be purchased in approximately the same quantities by similar types of users. Therefore, the interaction data 118 associated with the existing cohort item may be used in place of the absent interaction data 118 of the new item.

Block 706 determines, based on the interaction data 118 associated with the cohort item and with one or more other items, one or more items that are similar to the new item. For example, interaction data 118 may indicate one or more additional items that are frequently accessed or purchased during sessions or transactions associated with the cohort item. Continuing the example, if a threshold quantity or threshold percentage of users that viewed a webpage associated with the cohort item or purchased the cohort item also viewed webpages associated with certain other items or purchased the other items, the other items may be determined to be comparable to or similar to the cohort item. Because the cohort item and the new item include similar attribute values, the items determined to be comparable or similar to the cohort item may also be comparable or similar to the new item.

In other implementations, items that are similar to the new item may be determined using other methods. For example, similar items may be determined based on the category associated with the items. Continuing the example, if the new item is a cellular telephone, other bestselling cellular telephones associated with the same category may be determined to be comparable to the new item. In other implementations, similar items may be determined based on common attributes 116 associated with the new item and other items. For example, if the new item is a cellular telephone having certain associated attributes 116, other personal electronic devices, including similar cellular telephones and computers, may include many of the same attributes 116. Items that include a threshold quantity or percentage of attributes 116 that correspond to the attributes 116 of the new item may be determined to be similar. In still other implementations, similar items may be determined based on the values of one or more attributes 116. For example, a new item may include a tennis racquet having one or more of a price, a length, or a weight associated therewith. Other tennis racquets having a price, length, or weight within a threshold tolerance of the price, length, and weight of the new item may be determined to be similar to the new item. After determining items that are similar to a new item, an output 102 comparing the attribute values of the new item to one or more similar items may be generated. Block 708 generates an output 102 comparing attribute values of the new item to those of one or more similar items.

Figure 8:
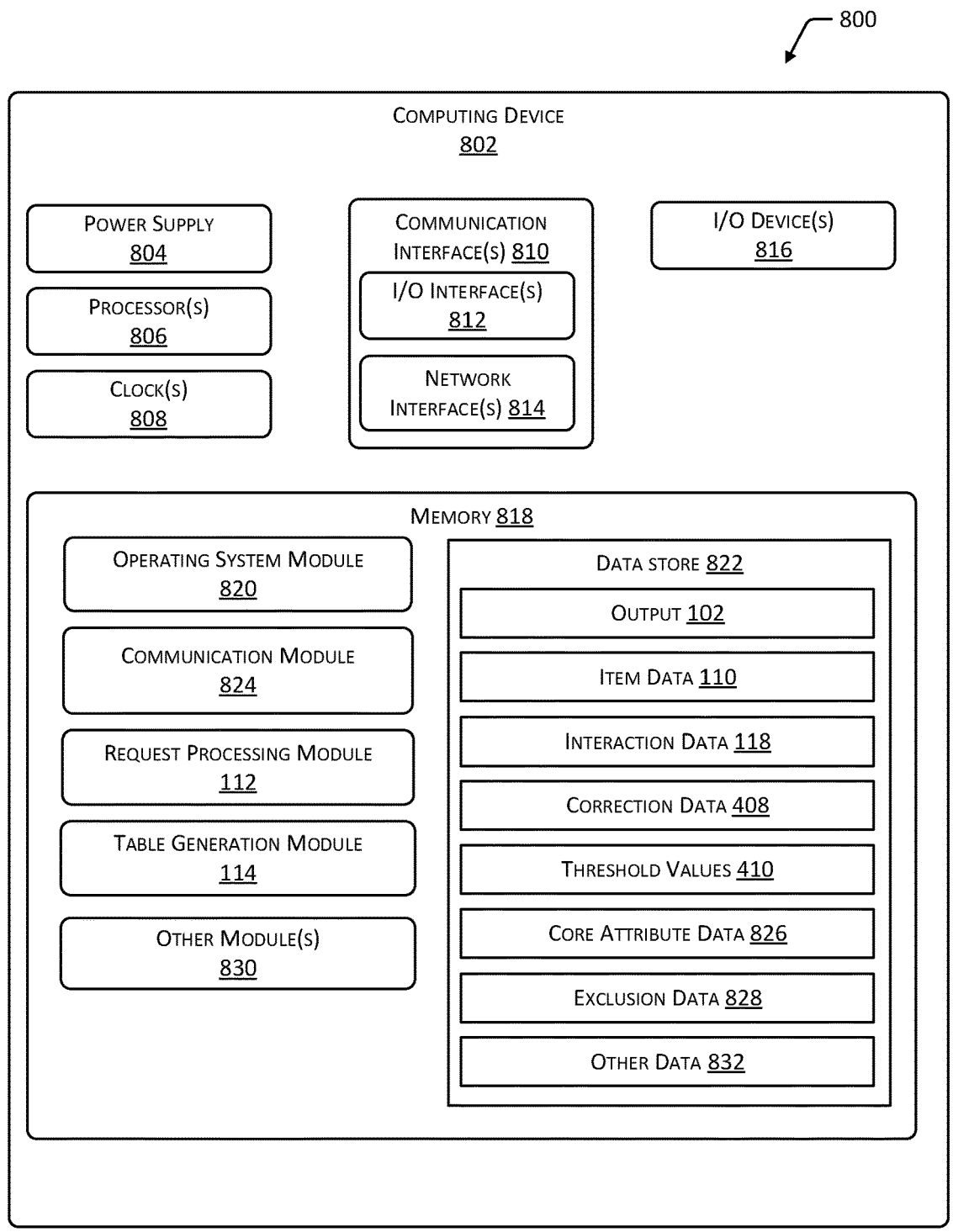
FIG. 8 is a block diagram illustrating a computing device within the scope of the present disclosure.

FIG. 8 is a block diagram 800 illustrating a computing device 802 within the scope of the present disclosure. The computing device 802 may include one or more user devices 104, comparison servers 108, or other computing devices 802 in communication therewith.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 808 to generate a timestamp, trigger a preprogrammed action, and so forth.

The computing device 802 may include one or more communication interfaces 810, such as input/output (I/O) interfaces 812, network interfaces 814, and so forth. The communication interfaces 810 may enable the computing device 802, or components of the computing device 802, to communicate with other computing devices 802 or components of the other computing devices 802. The I/O interfaces 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input device or output device associated with the computing device 802. For example, I/O devices 816 may include touch sensors, keyboards, mouse devices, microphones, image sensors (e.g., cameras), scanners, displays, speakers, haptic devices, printers, and so forth. In some implementations, the I/O devices 816 may be physically incorporated with the computing device 802 or may be externally placed.

The network interfaces 814 may be configured to provide communications between the computing device 802 and other devices, such as the I/O devices 816, routers, access points, and so forth. The network interfaces 814 may include devices configured to couple to one or more networks including LANs, wireless LANs, WANs, wireless WANs, and so forth. For example, the network interfaces 814 may include devices compatible with Ethernet, Wi-Fi, Bluetooth, ZigBee, Z-Wave, 3G, 4G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 822 and one or more of the following modules may also be stored in the memory 818. The modules may be executed as foreground applications, background tasks, daemons, and so forth. The data store 822 may use a flat file, database, linked list, tree, executable code, script, or other data structure to store information. In some implementations, the data store 822 or a portion of the data store 822 may be distributed across one or more other devices including other computing devices 802, network attached storage devices, and so forth.

A communication module 824 may be configured to establish communications with one or more other computing devices 802, such as user devices 104 and comparison servers 108. The communications may be authenticated, encrypted, and so forth.

The memory 818 may store the request processing module 112. As described previously with regard to FIG. 1, the request processing module 112 may receive user input 106 and determine correspondence between the user input 106 and item data 110 indicative of one or more items. The user input 106 may include a search query, a selection of an item, a selection of an attribute 116, and so forth. In some cases, the user input 106 may include an indication of a portion of item data 110 or a portion of an output 102 previously provided by the request processing module 112. The request processing module 112 may provide at least a portion of the item data 110 that corresponds to the user input 106 to a user device 104 associated with the user input 106. In some implementations, the request processing module 112 may modify, format, process, render, or otherwise prepare the item data 110. For example, the request processing module 112 may generate a webpage associated with a particular item for presentation on a browser interface of a user device 104. In other implementations, preparation of the item data 110 for presentation may be performed by the user device 104.

The request processing module 112 may also determine correspondence between one or more of the user input 106 or the determined item data 110 and one or more stored outputs 102. Based on the correspondence, one or more of the outputs 102 may be provided to the user device 104. For example, a table or other output 102 associated with an item may be provided to the user device 104 concurrent with the item data 110 associated with the item. Continuing the example, the output 102 may be included as part of a webpage indicative of the item.

The memory 818 may also store the output generation module 114. As described previously with regard to FIGS. 1 and 6, the output generation module 114 may access the item data 110 associated with a particular item and determine one or more attributes 116 associated with that item from the item data 110. The output generation module 114 may determine the particular attributes 116 to be included in an output 102 based on the item data 110 associated with the particular item and with other items available for purchase. For at least a subset of the attributes 116 of a particular item, the output generation module 114 may determine whether an attribute 116 is a generic attribute 116, common to all or most items, or an attribute 116 that is specific to the particular item or an associated category. If a quantity or percentage of items that have an attribute value for an attribute 116 exceeds a threshold value 410, the particular attribute 116 is determined to be a generic attribute 116 that may be excluded from the output 102.

The output generation module 114 may also determine the quantity of item data 110 associated with particular attributes 116. Specifically, the output generation module 114 may determine a quantity or percentage of items for which data indicative of a value for a particular attribute 116 is available. If a quantity or percentage of items that lack an attribute value for an attribute 116 exceeds a threshold value 410, the particular attribute may be excluded from the output 102.

The output generation module 114 may also determine values associated with particular attributes 116 and whether the attribute values differ significantly across multiple items. For example, if a quantity or percentage of items that have a common value for an attribute 116 exceeds a threshold value 410, that attribute 116 may be excluded from the output 102. A common value for an attribute 116 may include identical attribute values or attribute values that are within a threshold value 410 of one another.

The output generation module 114 may also determine correspondence between particular attributes 116 and core attribute data 826. Attributes 116 that correspond to the core attribute data 826 may be included in an output 102 independent of other determinations associated with the attributes 116. For example, the price of items may be included in a table or other output 102 independent of the fact that price is a generic attribute 116 common to nearly all items, and independent of the fact that many items may have an identical or similar price. As another example, the core attribute data 826 may include particular attributes 116 indicated to be of importance via user input 106. Continuing the example, user input 106 may include selection of an attribute 116 from within an output 102, as described with regard to FIG. 3 or a request to add an attribute 116 to an output 102, as described with regard to FIG. 4. Other types of user input 106 may also indicate importance of attributes 116. For example, a search query may include the terms "Laptop four USB ports", which may indicate that the quantity of USB ports is an attribute 116 of importance to users researching laptop computers. If a quantity or weight of user input 106 indicating particular attributes 116 exceeds a threshold quantity or weight, the particular attributes 116 may be added to the core attribute data 826.

The output generation module 114 may further determine correspondence between particular attributes 116 and exclusion data 828. Attributes 116 that correspond to the exclusion data 828 may be excluded from outputs 102 independent of other determinations associated with the attributes 116. For example, a particular attribute 116 may be specific to a particular category of items, data associated with values for attribute 116 may be available for most items within the category, and the values for the attribute 116 may differ significantly among the items. However, if the attribute 116 is indicated by the exclusion data 828, it may be excluded from the output 102 independent of other factors. In some implementations, exclusion data 828 may be determined at least partly based on user input 106. For example, user input 106 may indicate attributes 116 of disinterest. If a quantity or weight of user input 106 indicating particular attributes 116 of disinterest exceeds a threshold quantity or weight, the particular attributes 116 may be added to the exclusion data 828.

The output generation module 114 may additionally access interaction data 118 indicative of items that were purchased, viewed, or otherwise accessed during previous sessions or transactions where a particular item was purchased, viewed, or accessed. The interaction data 118 may be used to determine items that are comparable or similar to the particular item. In other implementations, the output generation module 114 may determine items that are comparable or similar to the particular item based on one or more of the category of the items, common attributes 116 associated with the items, or common attribute values associated with the items.

The output generation module 114 may also modify one or more outputs 102 based on user input 106. For example, the output generation module 114 may receive user input 106 indicative of an incorrect or absent value within an output 102. Based on correction data 408 indicative of weights associated with particular user accounts, the output generation module 114 may determine that the weight associated with user input 106 received from various user accounts exceeds a threshold value 410. Based on this determination, one or more of the outputs 102 may be modified.

Other modules 830 may also be present in the memory 818. For example, encryption modules may be used to encrypt and decrypt communications between computing devices 802. Authentication modules may be used to authenticate communications sent or received by computing devices 802. Other modules 830 may further include separate modules for machine learning, processing user input 106, natural language processing for determining attributes 116 from review data indicative of user reviews, and so forth.

Other data 832 within the data store 822 may include user input data, such as configurations and settings associated with computing devices 802. Other data 832 may include security data, such as encryption keys and schema, access credentials, and so forth. In some implementations, other data 832 may include user data, such as demographic data, search history, browsing history, and so forth, associated with a particular user account or group of user accounts. For example, tables or other outputs 102 associated with items available only to certain users, user groups, regions, and so forth, may be generated and provided to user devices 104 based at least partly on the user data.

In different implementations, different computing devices 802 may have different capabilities or capacities. For example, comparison servers 108 may have significantly more processor 806 capability and memory 818 capacity compared to the processor 806 capability and memory 818 capacity of user devices 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by a first set of one or more first computing devices, the method comprising:
   receiving, from a second set of one or more second computing devices, first user input indicative of a first item;
   accessing item data, wherein the item data indicates attributes associated with a plurality of items that includes the first item;
   determining at least one second item of the plurality of items, based on interaction data that indicates an amount of requests to access the at least one second item received by the first set of one or more first computing devices;
   determining exclusion data indicative of a first set of the attributes to be excluded from use for comparison of the plurality of items;
   based on the exclusion data and the attributes associated with the plurality of items, determining a second set of the attributes not included in the exclusion data for comparison of the plurality of items;
   automatically generating a user interface including an identifier associated with the at least one second item and values for the second set of the attributes for the first item and the at least one second item; and
   providing the user interface to the second set of one or more second computing devices, wherein the user interface presents the first item and the at least one second item of the plurality of items in association with corresponding values for the second set of the attributes.

2. The method of claim 1, further comprising:
   determining, based on the item data, a subset of the attributes that are common to the plurality of items;
   determining that the subset of the attributes that are common to the plurality of items exceeds a threshold value; and
   determining the plurality of items based on the subset of the attributes that are common to the plurality of items exceeding the threshold value.

3. The method of claim 1, further comprising:
   determining a category associated with the plurality of items, the category having a set of attributes common to the plurality of items; and
   determining the plurality of items based on the category.

4. The method of claim 1, further comprising:
   determining the second set of the attributes to be unique to one or more of: the plurality of items or a category associated with the plurality of items.

5. The method of claim 1, wherein determining the second set of the attributes includes:
   determining a portion of the plurality of items having values associated with the second set of the attributes; and
   determining a size of the portion to exceed a threshold value.

6. The method of claim 1, further comprising:
   determining values associated with the second set of the attributes to be one or more of: equal for a portion of the plurality of items or unequal for the portion of the plurality of items; and
   determining a number of items of the portion of the plurality of items to be less than a threshold value.

7. The method of claim 1, further comprising:
   based on the exclusion data and the attributes associated with the plurality of items, excluding one or more of an item or an attribute from the user interface; and
   generating a notification indicative of a rationale for exclusion of the one or more of the item or the attribute.

8. The method of claim 1, further comprising:
   receiving a search query including one or more terms;
   determining correspondence between the one or more terms and the item data;
   determining the plurality of items based on the correspondence between the one or more terms and the item data;
   presenting search results responsive to the search query; and providing the user interface responsive to the search query.

9. The method of claim 1, further comprising:
receiving a request to access a first portion of the item data associated with the first item of the plurality of items;
presenting the first portion of the item data responsive to the request;
providing the user interface responsive to the request, wherein the user interface includes an identifier associated with the at least one second item of the plurality of items;
receiving user input indicative of the at least one second item of the plurality of items; and
presenting a second portion of the item data associated with the at least one second item of the plurality of items responsive to the user input.

10. The method of claim 1, further comprising:
receiving second user input indicative of a particular attribute presented in the user interface, the particular attribute having a first value;
determining, based on the item data, a subset of the plurality of items having a second value for the particular attribute, wherein the second value is equal to the first value; and
generating a second user interface including identifiers indicative of the subset of the plurality of items and values associated with the second set of the attributes.

11. The method of claim 1, further comprising:
receiving second user input indicative of the at least one second item presented in the user interface; and
presenting information associated with the at least one second item in response to the second user input.

12. A system comprising:
one or more memories storing computer-executable instructions; and
one or more hardware processors configured to execute the computer-executable instructions to:
access first item data indicative of first attributes associated with a first item of a plurality of items;
determine at least one second item of the plurality of items, based on interaction data that indicates an amount of requests to access the at least one second item;
access exclusion data indicative of second attributes that are common to at least a threshold portion of the plurality of items;
determine, based on the first item data and the exclusion data, third attributes that are common to the first item and the at least one second item;
automatically generate an output that includes a plurality of identifiers associated with the first item and the at least one second item, wherein the output further includes values for the third attributes for the first item and the at least one second item; and
provide, using one or more networks, the output to a computing device to cause the computing device to present a user interface in which the first item and the at least one second item are associated with corresponding values for the third attributes.

13. The system of claim 12, further comprising computer-executable instructions to:
access second item data associated with the at least one second item, the second item data indicative of fourth attributes associated with the at least one second item; and
determine the third attributes based on the second item data and the first item data.

14. The system of claim 12, wherein the output causes the computing device to generate the user interface as a table including:
a first identifier of the plurality of identifiers, wherein the first identifier is indicative of the first item;
first values associated with the first item data for at least a first portion of the third attributes, the first values associated with the first identifier;
one or more second identifiers of the plurality of identifiers, wherein the one or more second identifiers are indicative of the at least one second item; and
second values associated with the at least one second item for the at least a first portion of the third attributes, the second values associated with the one or more second identifiers.

15. The system of claim 12, further comprising computer-executable instructions to:
receive a request from the computing device to access a portion of the first item data;
generate the user interface including the portion of the first item data, the portion of the first item data occupying a first portion of the user interface;
determine a size of a second portion of the user interface;
modify the output based on the size of the second portion of the user interface to form a modified output; and
generate the modified output for presentation in the second portion of the user interface responsive to the request.

16. A system comprising:
one or more memories storing computer-executable instructions; and
one or more hardware processors configured to execute the computer-executable instructions to:
access first item data indicative of first attributes associated with a first item;
determine one or more second items based on interaction data that indicates an amount of requests to access the one or more second items;
determine second item data for the one or more second items, the second item data indicative of second attributes associated with the one or more second items;
based on the first item data and the second item data, determine exclusion data indicative of third attributes not unique to one or more of: the first item, the one or more second items, a category associated with the first item, or a category associated with the one or more second items;
based on correspondence between the exclusion data, the first item data, and the second item data, determine fourth attributes that are unique to the one or more of the first item, the one or more second items, the category associated with the first item, or the category associated with the one or more second items;
generate an output including:
a first identifier indicative of the first item, wherein the first identifier is associated with values of the fourth attributes for the first item; and
one or more second identifiers indicative of the one or more second items, wherein the one or more second identifiers are associated with values of the fourth attributes for the one or more second items; and
provide, using one or more networks, the output to a computing device to cause the computing device to present a user interface in which the first identifier is associated with the values of the fourth attributes for the first item and the one or more second items are associated the values of the fourth attributes for the one or more second items.

17. The system of claim 16, further comprising computer-executable instructions to:

access review data associated with at least one of the one or more second items, the review data including terms indicative of at least one attribute of the fourth attributes; and determine at least one attribute of the fourth attributes based on the terms of the review data.

18. The system of claim 16, further comprising computer-executable instructions to:

receive user input indicative of a particular attribute value within the user interface;

determine one or more of a weight or a count of users associated with the user input to exceed a threshold value; and modify the output based on the user input.

19. The system of claim 16, further comprising computer-executable instructions to:

determine a modification to one or more of the first item data or the second item data, the modification including one or more of:

an addition of an item;

a removal of an item;

a change in a value for an attribute;

an addition of a value for an attribute; or a removal of a value for an attribute; and modify the output based on the modification to the one or more of the first item data or the second item data.

20. The system of claim 16, further comprising computer-executable instructions to:

receive user input indicative of a particular attribute;

determine, based on the first item data and the second item data, values for the particular attribute for one or more of the first item or the one or more second items; and add, to the output, the values for the particular attribute for one or more of the first item or the one or more second items.

* * * * *